(12) United States Patent
Rodriguez Marchant

(10) Patent No.: US 9,438,964 B2
(45) Date of Patent: *Sep. 6, 2016

(54) CAPTURING VIDEO OF AN IMAGE WITH EMBEDDED CODE TO ACCESS CONTENT

(71) Applicant: Video Expressions LLC, Layton, UT (US)

(72) Inventor: Rene Rodriguez Marchant, Layton, UT (US)

(73) Assignee: VIDEO EXPRESSIONS LLC, Layton, UT (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/900,466

(22) Filed: May 22, 2013

(65) Prior Publication Data

US 2013/0308773 A1 Nov. 21, 2013

Related U.S. Application Data

(63) Continuation of application No. 13/899,502, filed on May 21, 2013.

(60) Provisional application No. 61/649,446, filed on May 21, 2012.

(51) Int. Cl.
*H04N 21/81* (2011.01)
*H04L 9/28* (2006.01)
(Continued)

(52) U.S. Cl.
CPC ...... *H04N 21/812* (2013.01); *G06F 17/30817* (2013.01); *G06F 21/16* (2013.01); *G06K 7/1092* (2013.01); *G06T 1/0021* (2013.01);
(Continued)

(58) Field of Classification Search
CPC ........... H04N 21/812; H04N 1/32208; H04N 1/32251; H04N 1/32293; H04N 1/32309; H04N 2201/3254; H04N 2201/327; H04N 2201/3247; H04N 2201/3281; H04N 2201/3249; H04L 9/28; H04L 9/32; H04L 9/3247; H04L 2209/16; G06F 21/16; G06F 17/30817; G09C 5/00; G06K 7/1092; G06T 1/0021

See application file for complete search history.

(56) References Cited

U.S. PATENT DOCUMENTS 5,729,252 A * 3/1998 Fraser ............... G06F 17/30056
235/470
6,678,425 B1 * 1/2004 Flores ...................... G06K 9/22
235/454

(Continued)

OTHER PUBLICATIONS

U.S. Appl. No. 13/900,472, Office Action, Mailed: Sep. 5, 2014.
(Continued)

*Primary Examiner* — Eleni Shiferaw
*Assistant Examiner* — Gregory M Elmore
(74) *Attorney, Agent, or Firm* — Kunzler Law Group

(57) ABSTRACT

An apparatus for communicating content is disclosed. A system and method also perform the functions of the apparatus. The apparatus includes a capturing module that captures a live video of an image and an environment surrounding the image. The image has an embedded cryptographic representation of a code and the code corresponds to a unit of content. The apparatus includes a decoding module that decodes the embedded cryptographic representation of the code, a content retrieval module that retrieves the unit of content corresponding to the code from a storage location, and a display module that displays the unit of content on the live video of the image or the image environment.

17 Claims, 17 Drawing Sheets

(51) Int. Cl.
*G06F 21/16* (2013.01)
*G09C 5/00* (2006.01)
*H04N 1/32* (2006.01)
*G06F 17/30* (2006.01)
*G06K 7/10* (2006.01)
*G06T 1/00* (2006.01)
*H04L 9/32* (2006.01)

(52) U.S. Cl.
CPC .................. *G09C 5/00* (2013.01); *H04L 9/28* (2013.01); *H04L 9/32* (2013.01); *H04N 1/32208* (2013.01); *H04L 9/3247* (2013.01); *H04L 2209/16* (2013.01); *H04N 1/32251* (2013.01); *H04N 1/32293* (2013.01); *H04N 1/32309* (2013.01); *H04N 2201/327* (2013.01); *H04N 2201/3247* (2013.01); *H04N 2201/3249* (2013.01); *H04N 2201/3254* (2013.01); *H04N 2201/3271* (2013.01); *H04N 2201/3274* (2013.01); *H04N 2201/3281* (2013.01)

(56) References Cited

U.S. PATENT DOCUMENTS

| | | | | |
|---|---|---|---|---|
| 7,886,978 | B2* | 2/2011 | Ofek | G06K 7/14 235/462.1 |
| 2003/0128401 | A1* | 7/2003 | Conrow | H04N 1/00002 358/300 |
| 2004/0117629 | A1* | 6/2004 | Koto | G06T 1/0028 713/176 |
| 2004/0264736 | A1* | 12/2004 | Parisis | G06T 1/0028 382/100 |
| 2005/0179765 | A1 | 8/2005 | Jones et al. | |
| 2006/0026140 | A1 | 2/2006 | King et al. | |
| 2008/0023546 | A1* | 1/2008 | Myodo | G06K 7/14 235/462.04 |
| 2009/0059307 | A1* | 3/2009 | Matsumura | G06T 1/0071 358/3.28 |
| 2010/0020188 | A1* | 1/2010 | Yamaguchi | G11B 27/034 348/220.1 |
| 2010/0296649 | A1 | 11/2010 | Katzenbeisser et al. | |
| 2011/0066860 | A1 | 3/2011 | Dettinger | |
| 2012/0013770 | A1* | 1/2012 | Stafford | H04N 5/272 348/239 |
| 2012/0199647 | A1 | 8/2012 | Hwang et al. | |
| 2013/0194569 | A1* | 8/2013 | Lee | G01B 11/24 356/237.4 |
| 2013/0222579 | A1* | 8/2013 | Lee | G01C 11/02 348/135 |

OTHER PUBLICATIONS

U.S. Appl. No. 13/899,502, Office Action, Mailed: Sep. 12, 2014.
U.S. Appl. No. 13/899,502, Office Action, Mailed: Feb. 26, 2015.
U.S. Appl. No. 13/900,422, Notice of Allowance, Mailed: Mar. 30, 2015.
U.S. Appl. No. 13/900,472, Notice of Allowance, Mailed: Apr. 7, 2015.
Irani, Michal, P. Anandan, and Steve Hsu. "Mosaic based representations of video sequences and their applications." Computer Vision, 1995. Proceedings., Fifth International Conference on. IEEE, 1995.
Abdel-Mottaleb, Mohamed, et al. "CONIVAS: CONtent-based image and video access system." Proceedings of the fourth ACM international conference on Multimedia. ACM, 1997.
Notice of allowance, mailed Jun. 8, 2015, U.S. Appl. No. 13/899,502.
Notice of allowance, mailed Mar. 30, 2015, U.S. Appl. No. 13/900,422.

* cited by examiner

CAPTURING VIDEO OF AN IMAGE WITH EMBEDDED CODE TO ACCESS CONTENT

CROSS-REFERENCES TO RELATED APPLICATIONS

This application is a continuation application of and claims priority to U.S. patent application Ser. No. 13/899,502 entitled "EMBEDDING INFORMATION IN AN IMAGE" and filed on May 21, 2013 for Rene Rodriguez Marchant, which claims the benefit of U.S. Provisional Patent Application No. 61/649,446 entitled "APPARATUS, SYSTEM, AND METHOD FOR EMBEDDING INFORMATION IN AN IMAGE" and filed on May 21, 2012, and which are herein incorporated by reference. U.S. patent application Ser. No. 13/900,422 entitled "DISPLAYING CONTENT ASSOCIATED WITH CODE EMBEDDED IN AN IMAGE" and filed on May 22, 2013 for Rene Rodriguez Marchant, and U.S. patent application Ser. No. 13/900,472 entitled "DISPLAYING VIDEO RETRIEVED FROM EMBEDDED CODE IN A STILL IMAGE" and filed on May 22, 2013 for Rene Rodriguez Marchant, are incorporated herein by reference.

FIELD

This invention relates to displaying content associated with information embedded in an image and more particularly relates to capturing video of an image with embedded code to access content.

BACKGROUND

Advertising has changed dramatically in a short period of time. The internet has brought new advertising methods and consumers are moving away from traditional print and television advertising. Social media has brought new avenues of advertising as well. As a result, consumers often look to the internet for information about a product before buying. Even when consumers visit a brick and mortar store, they often use a mobile electronic device, such as a smartphone or tablet computer to seek more information. Increasingly consumers are looking for videos for information about a product or service rather than taking time to read text. Videos about products have increased dramatically, but vendors continue to struggle to distinguish their products over millions of other products and websites.

SUMMARY

An apparatus for communicating content is disclosed. A system and method also perform the functions of the apparatus. The apparatus includes a capturing module that captures a live video of an image and an environment surrounding the image. The image has an embedded cryptographic representation of a code and the code corresponds to a unit of content. The apparatus includes a decoding module that decodes the embedded cryptographic representation of the code, a content retrieval module that retrieves the unit of content corresponding to the code from a storage location, and a display module that displays the unit of content on the live video of the image or the image environment.

In one embodiment, the apparatus includes an orientation module that determines an orientation of the image. In another embodiment, the display module displays the unit of content in an orientation corresponding to the orientation of the image. In another embodiment, the display module displays the unit of content on the live video of the image, with the unit of content extending from the image in three dimensions. In another embodiment, an orientation of the unit of content changes in response to a change in the orientation of the image.

In one embodiment, the image includes an embedded cryptographic representation of at least one character of the code, wherein the embedded cryptographic representation of the at least one character identifies an orientation of the at least a portion of the image. In another embodiment, each cryptographic representation of each character of the code includes a group of regularly spaced mark locations. Each mark location has a mark selected from a normative mark or a native mark. A pattern of marks in the group of regularly spaced mark locations is unique to each character in the code.

In one embodiment, the orientation of the rendering of the at least a portion of the image is determined by comparing a distance between mark locations in a first group of regularly space mark locations with a distance between mark locations in a second group of regularly spaced mark locations. In another embodiment, the normative mark includes a marking added to the image. The marking has a perceptible difference between a native intensity value of a location in the image and an intensity value of the marking added to the image. In another embodiment, the perceptible difference between the native intensity value of the location in the image and the intensity value of the marking added to the image includes a difference that is greater than a predefined threshold. In another embodiment, the marking is added to a particular color channel of the image. In yet another embodiment, the marking is added to a blue color channel of the image.

In one embodiment, the display module changes the displayed orientation of the unit of content in response to the orientation module determining that the orientation of the rendering of at least a portion of the image has changed. In another embodiment, the capture module captures the live video of the image using one or more of a video camera connected to a computing device, a video camera in a smartphone, a video camera in a tablet computer, and a video camera in a laptop computer.

A method for communicating content includes capturing a live video of an image and an environment surrounding the image. The image has an embedded cryptographic representation of a code, the code corresponding to a unit of content. The method includes decoding the embedded cryptographic representation of the code, retrieving the unit of content corresponding to the code from a storage location, and displaying the unit of content on at least one of the live video of the image and the image environment.

In one embodiment, the method includes determining an orientation of the image. In another embodiment, displaying the unit of content includes displaying the unit of content in an orientation corresponding to the orientation of the image. In another embodiment, the image includes an embedded cryptographic representation of at least one character of the code. The embedded cryptographic representation of the at least one character identifies an orientation of the at least a portion of the image. In another embodiment, each cryptographic representation of each character of the code includes a group of regularly spaced mark locations. Each mark location has a mark selected from a normative mark or a native mark. A pattern of marks in the group of regularly spaced mark locations is unique to each character in the code.

A system for communicating content includes a computing device, a display device in communication with the computing device, and a video camera in communication with the computing device. The computing device includes a capturing module that captures a live video of an image using the video camera and an environment surrounding the image using the video camera. The image has an embedded cryptographic representation of a code. The code corresponds to a unit of content. The computing device includes a decoding module that decodes the embedded cryptographic representation of the code, a content retrieval module that retrieves the unit of content corresponding to the code from a storage location, and a display module that displays, on the display device, the unit of content on at least one of the live video of the image and the image environment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
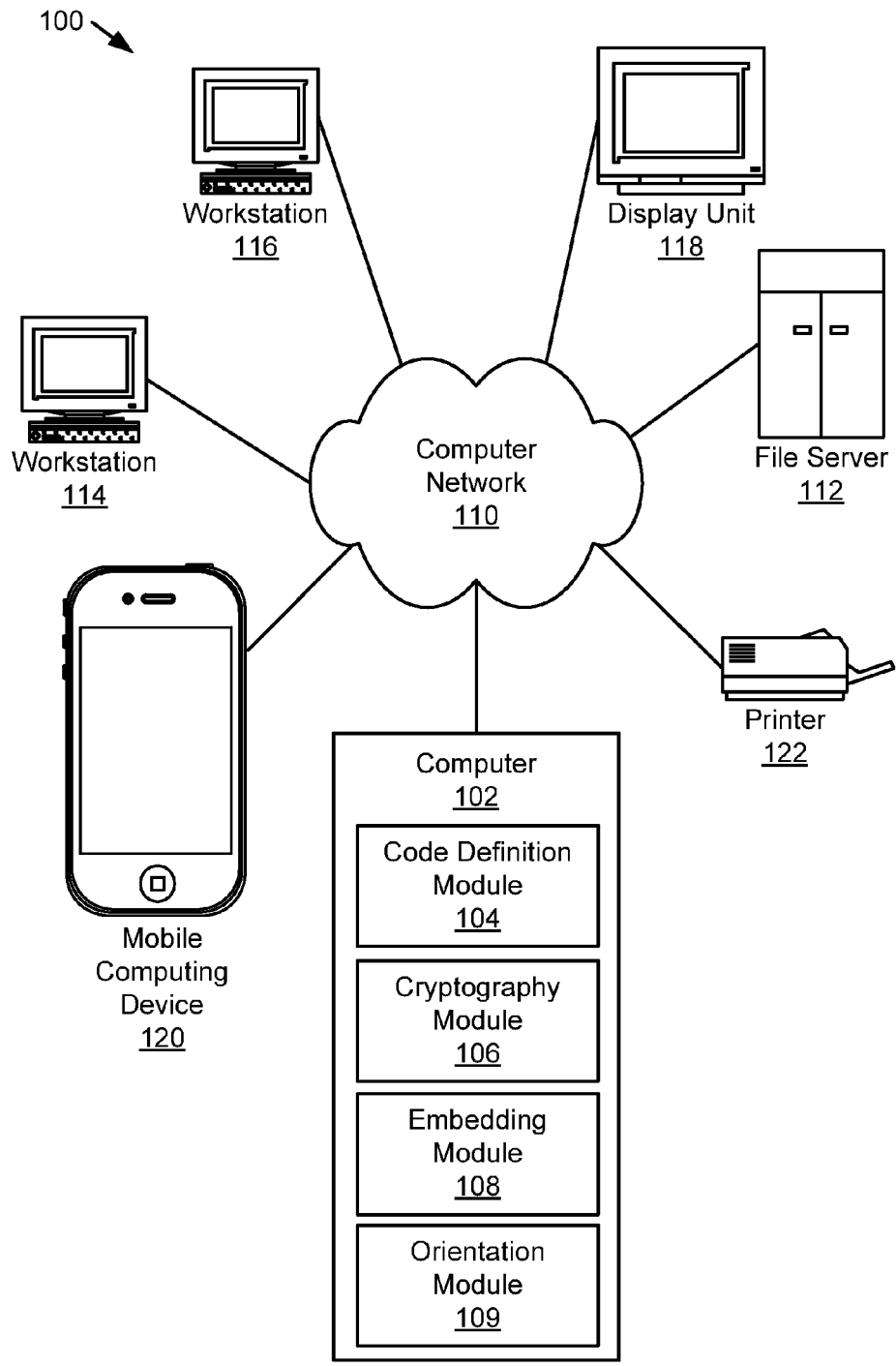
FIG. 1 is a schematic block diagram illustrating one embodiment of a system 100 to embed information in an image in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 illustrates a schematic block diagram of a system 100 to embed information in an image according to one embodiment of the present invention. The system 100 includes a computer 102 having a code definition module 104, a cryptography module 106, an embedding module 108, and an orientation module 109. In certain embodiments the system 100 also includes a computer network 110, a file server 112, a number of work stations such as work stations 114 and 116, a display unit 118, a mobile computing device 120, and a printer 122.

While the embodiment illustrated in FIG. 1 shows the code definition module 104, the cryptography module 106, the embedding module 108, and the orientation module 109 as being stored on a computer 102, one skilled in the art will recognize that the code definition module 104, the cryptography module 106, the embedding module 108, and the orientation module 109 may be contained within a file server 112, a mainframe, a personal computer, a laptop, a personal digital assistant, or other computing device. The computer 102 and the file server 112 are connected to the computer network 110 providing remote access to the code definition module 104, the cryptography module 106, the embedding module 108, and the orientation module 109 via a computer network 110.

The code definition module 104, the cryptography module 106, the embedding module 108, and the orientation module 109 may be accessed directly through input/output devices connected to the computer 102 or through the computer network 110 in a client-server relationship, remote access, or other network-related operation. One of skill in the art will recognize other ways to access the code definition module 104, the cryptography module 106, the embedding module 108, and the orientation module 109.

In one embodiment, the code definition module 104, the cryptography module 106, the embedding module 108, and the orientation module 109 are stored on a data storage device in or connected to a computer 102. In another embodiment, the code definition module 104, the cryptography module 106, the embedding module 108, and the orientation module 109 may be distributed in different locations throughout the system 100. In certain embodiments the code definition module 104 may be stored on one device within the system 100 and the cryptography module 106, the embedding module 108, and the orientation module 109 may be stored other devices within the system 100. One of skill in the art will recognize other ways to store and execute portions of the code definition module 104, the cryptography module 106, the embedding module 108, and the orientation module 109.

As further discussed below, in certain embodiments, the system 100 may include a display unit 118, a mobile computing device 120, and/or a printer 122 for displaying an image having embedded information therein. In certain embodiments, the display unit 118 may be a standalone display such as a monitor or a television. In one embodiment, the embedded image, having embedded cryptographic representations, may be displayed on a mobile computing device 120 such as a conventional cellular phone, a Smartphone, a Personal Data Assistant (PDA), a tablet computer, etc. In other embodiments, the embedded image may be printed on a printer 122 such as a convention dot matrix printer, laser printer, etc. One of skill in the art will recognize other ways of displaying the embedded image.

Figure 2:
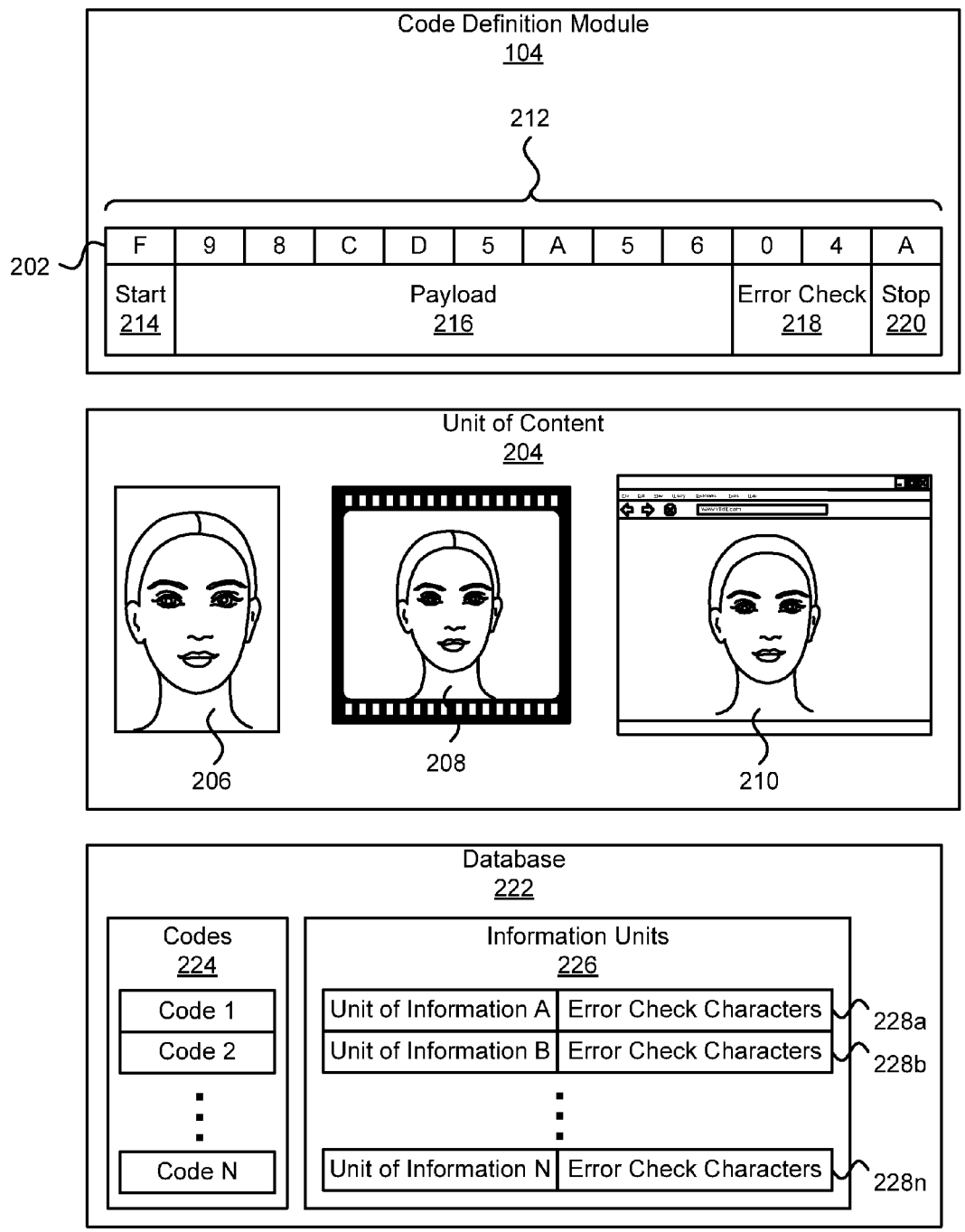
FIG. 2 is a schematic block diagram illustrating one embodiment of a code definition module in accordance with the present invention.

FIG. 2 is a schematic block diagram illustrating one embodiment of a code definition module 104 in accordance with the present invention. In certain embodiments, the code definition module 104 defines a code 202 corresponding to a unit of content 204. The unit of content 204, in one embodiment, may be any digital information relayable to a user. For example, in one embodiment, the unit of content may be a two or three dimensional image 206 uniquely linked to or referenced by the code 202. In other embodiment, the unit of content 204 may be a Uniform Resource Locator (URL) directing a user to a webpage 210 uniquely linked to or referenced by the code 202. In yet another embodiment, the unit of content may be a two or three dimensional video image 208 uniquely linked to or referenced by the code 202. One of skill in the art will recognize other units of content 204 (i.e. informational units) that may be linked to or referenced by the code 202.

In certain embodiments, the units of content 204 referenced by or linked to the code 202 may be stored on the computer 102, the file server 112, the mobile device, or on any of the work stations 114-116. In such an embodiment, the units of information may reside or be stored within the system 100. In other embodiments, the units of content 204 may reside or be stored on a remote device or system (not shown).

The code 202, in certain embodiments, includes at least one character 212. In certain embodiments, the characters 212 defining the code 202 are unique to a particular unit of content. In other embodiments, the characters 212 may be unique to a number of units of content 204. For example, in certain embodiments, the code 202 may linked to or reference one or more still image 206, one or more video image 208 and/or one or more webpages 210.

The characters 212 comprising the code 202, in one embodiment, are an alphanumeric character. For example, in certain embodiments, each character 212 may be any numeral from zero (0) through nine (9) and/or an alphabet character from A through F. Thus, in one embodiment, the code may contain various arrangements of the sixteen different characters 212. One of skill in the art will recognize that in other embodiments, the characters 212 may be non-alphanumeric characters. Similarly, one of skill in the art will recognize that in certain embodiments, the code 202 may include additional alphabet characters other than the characters A through F.

The characters 212 are arranged to create an identifier unique to one or more units of content 204. In one embodiment, the code includes twelve characters 212. For example, in the embodiment illustrated in FIG. 1, the code 202 includes the characters "F, 9, 8, C, D, 5, A, 5, 6, 0, 4, and A." This code 202 may be unique to a particular unit of content 204, i.e., video image 208. Thus, as further discussed below, when a particular image includes an embedded code "F98CD5A5604A" the code 202 may be used to retrieve the video image 208 corresponding to that code 202. Of course, other codes 202 will have a different arrangement of characters 212 that identify different units of content 204.

In one embodiment, the code 202 includes a start identifier 214, a payload section 216, an error check section 218, and a stop identifier 220. In certain embodiments, only the payload section 216 is unique to a particular unit of content 204. In such an embodiment, the start identifier 214 may be the same character for every code 202 defined by the code definition module 104. Similarly, the stop identifier 220 may be the same character for every code 202 defined by the code definition module 104. For example, in the embodiment illustrated in FIG. 2, the start identifier 214 is an "F" character 212 and the stop identifier 220 is an "A" character 212. Any other codes 202 defined by the code definition module 104 will have an "F" as the start identifier 214 and an "A" as the stop identifier 220. One of skill in the art will recognize that in certain embodiments, the start identifier 214 and the stop identifier 220 may be a character 212 other than an "F" and an "A" respectively.

In other embodiments, the start identifier 214 and the stop identifier 220 may be different for each code 202. Thus, in one embodiment, the start identifier 214 for one code 202 may be a character 212 i.e., a "C," for another code 202 the start identifier 214 may be a "D," for another code 202 the start identifier may be a "0," etc. Similarly, in certain embodiments, the stop identifier 220 for one code may be a character 212 i.e., a "9," for another code 202 the stop identifier 220 may be an "F," for another code 202 the stop identifier 220 may be an "E," etc.

The payload section 216 is unique to a particular unit of content 204. In certain embodiments, the payload section 216 includes eight (8) characters 212. A payload section 216 having eight (8) characters 212 selected from a sixteen (16) possible characters 212 gives four billion two hundred ninety four million nine hundred sixty seven thousand two hundred and ninety six (4,294,967,296) possible arrangements of the characters. Accordingly, if the payload section 216 is limited to eight (8) characters 212, the code definition module 104 can uniquely define a code for four billion two hundred ninety four million nine hundred sixty seven thousand two hundred and ninety six (4,294,967,296) units of content 204. In embodiments where this number is insufficient, the payload section 216 of the code 202 can be increased to include more characters 212.

In certain embodiments, each unit of content 204 is correlated to a particular code 202 through a database 222 that includes a listing of codes 224 and a listing of information units 226 corresponding to the codes. As further discussed below, when a code 202 is identified in an image, the database 222 is referenced to determine which unit of content 204 corresponds to that code 202.

Given the large number of possible arrangements of the characters 212 in the code 202, in certain embodiments, the code 202 may include an error check section 218 for checking the payload section 216 of the code 202 to determine the reliability of the payload section 216 of the code 202. The error check section 218 of the code 202, in one embodiment, includes a fixed number of characters 212 derived from an algorithm. The listing of information units 226 in the database 222 also includes error check characters 228. The algorithm used to derive the characters 212 in the error check section 218 of the code 202 is the same algorithm used to derive the error check characters 228 in the listing of information units 226. When a code 202 is identified in an image, the algorithm is used to determine if characters 212 in the error check section 218 of the code 202 and the error check characters 228 in the listing of the information units 226 match. If the characters 212 in the error check section 218 of the code 202 and the error check characters 228 in the listing of the information units 226 match, the code 202 can be verified as a correct code 202. If the characters 212 in the error check section 218 of the code 202 and the error check characters 228 in the listing of the information units 226 do not match, the identified code 202 in the image is incorrect and the image should be rechecked or rescanned to determine a correct code 202.

Figure 3A:
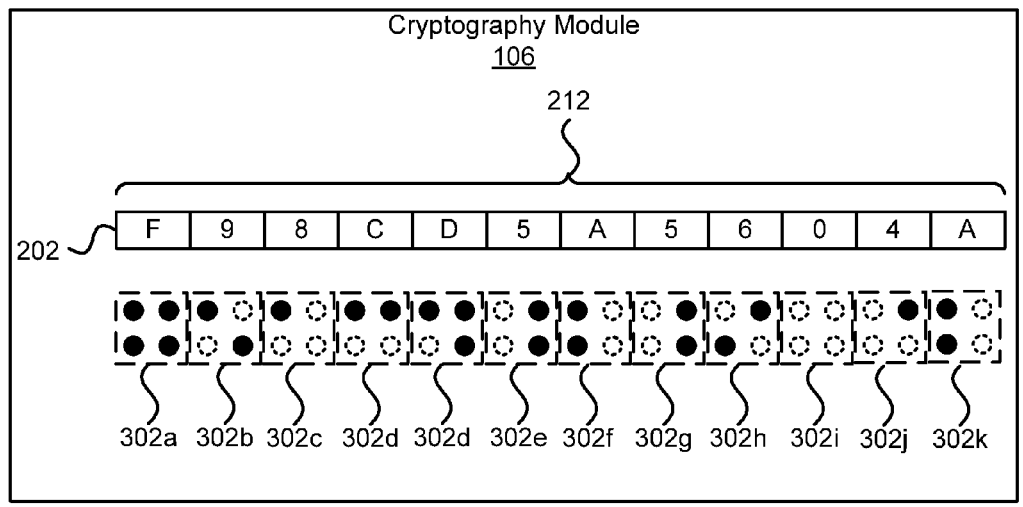
FIG. 3A is a schematic block diagram illustrating one embodiment of a cryptography module in accordance with the present invention.

FIG. 3 is a schematic block diagram illustrating one embodiment of a cryptography module 106 in accordance with the present invention. In certain embodiments, the cryptography module 106 defines a cryptographic representation 302 for each character 212 of the at least one character 212 in the code 202.

Figure 3B:
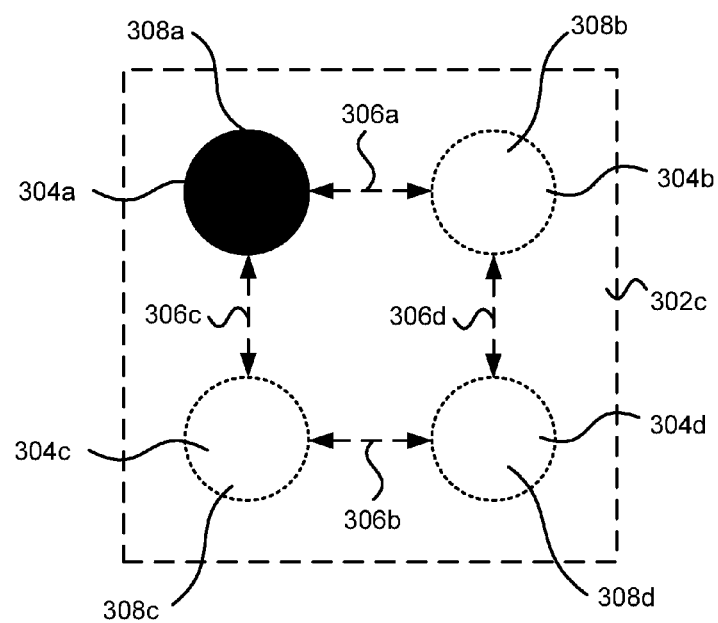
FIG. 3B is a schematic block diagram illustrating one embodiment of a cryptographic representation of a character in accordance with the present invention.

FIG. 3B illustrates an enlarged schematic block diagram of a cryptographic representation 302c of a character 212. Each cryptographic representation 302 is a group of regularly spaced mark locations 304. Thus, a distance between mark location 304a and mark location 304b as illustrated by line 306a is approximately the same as a distance between mark location 304c and mark location 304d as illustrated by line 306b. Similarly, a distance between mark location 304a and mark location 304c as illustrated by line 306c is approximately the same as a distance between mark location 304c and mark location 304d as illustrated by line 306d. In certain embodiments, each mark location 304 is equidistant from at least two mark locations 304. For example, in one embodiment, distances 306a, 306b, 306c and 306d are substantially equal. As further discussed below, an array of regularly spaced mark locations 304 allows an orientation of an image having imbedded cryptographic representations 302 to be determined.

In certain embodiments, each mark location 304 includes a either a normative mark 308a or a native mark 308b-308d. A normative mark 308a is a marking added to an image that has a perceptible difference between a native intensity value of a location in the image and an intensity value of the marking added to the image. A native mark 308b-308d is a marking having an intensity value substantially similar to a native intensity value of a location in the image corresponding to a particular mark location 304. That is, a native mark 308b-308d has the same intensity value in a particular area as the original unaltered image. For example, in the embodiment illustrated in FIG. 3B, mark locations 304b-304d have native or unaltered markings 308b-308d such that the intensity values for mark locations 304b-304d is substantially the same as the intensity values for the areas in the original unaltered image. Mark location 304a, on the other hand, includes a normative mark 308a. Thus, mark location 304a includes a marking that has a perceptible difference between the native intensity of the original image and the marking added to mark location 304a.

In certain embodiments, the perceptible difference for a normative mark 308a may be a difference between the native intensity value of the location in the image and the intensity value of the marking added to the image that is greater than a predefined threshold. In such an embodiment, the predefined threshold may be varied to optimize recognition of the intensity difference. In another embodiment, the predefined threshold may be varied as a tradeoff between distortion of the image (i.e., markings observable by the naked eye) and recognition of the markings by a computer implemented process. In yet another embodiment, the predefined threshold may be a maximum difference between the native intensity value of the location in the image and the intensity value of the marking added to the image.

In the embodiment illustrated in FIG. 3B, the native mark locations 304b-304d are illustrated as having a dashed line surrounding each mark location 304b-304d. One of skill in the art will recognize that the dashed line is for illustrative purposes. Accordingly, in certain embodiments, the native mark locations 304b-304d may simply have native markings (i.e., markings that occur in the native image). In other embodiments, the native mark locations 304b-304d may include a marking (such as the dashed lines). Additionally, the embodiment illustrated in FIG. 3B depicts the markings as being circular. However, one of skill in the art will recognize that in other embodiments, the markings may be square, rectangular, triangular, octagonal, or any other geometric shape.

Figure 4:
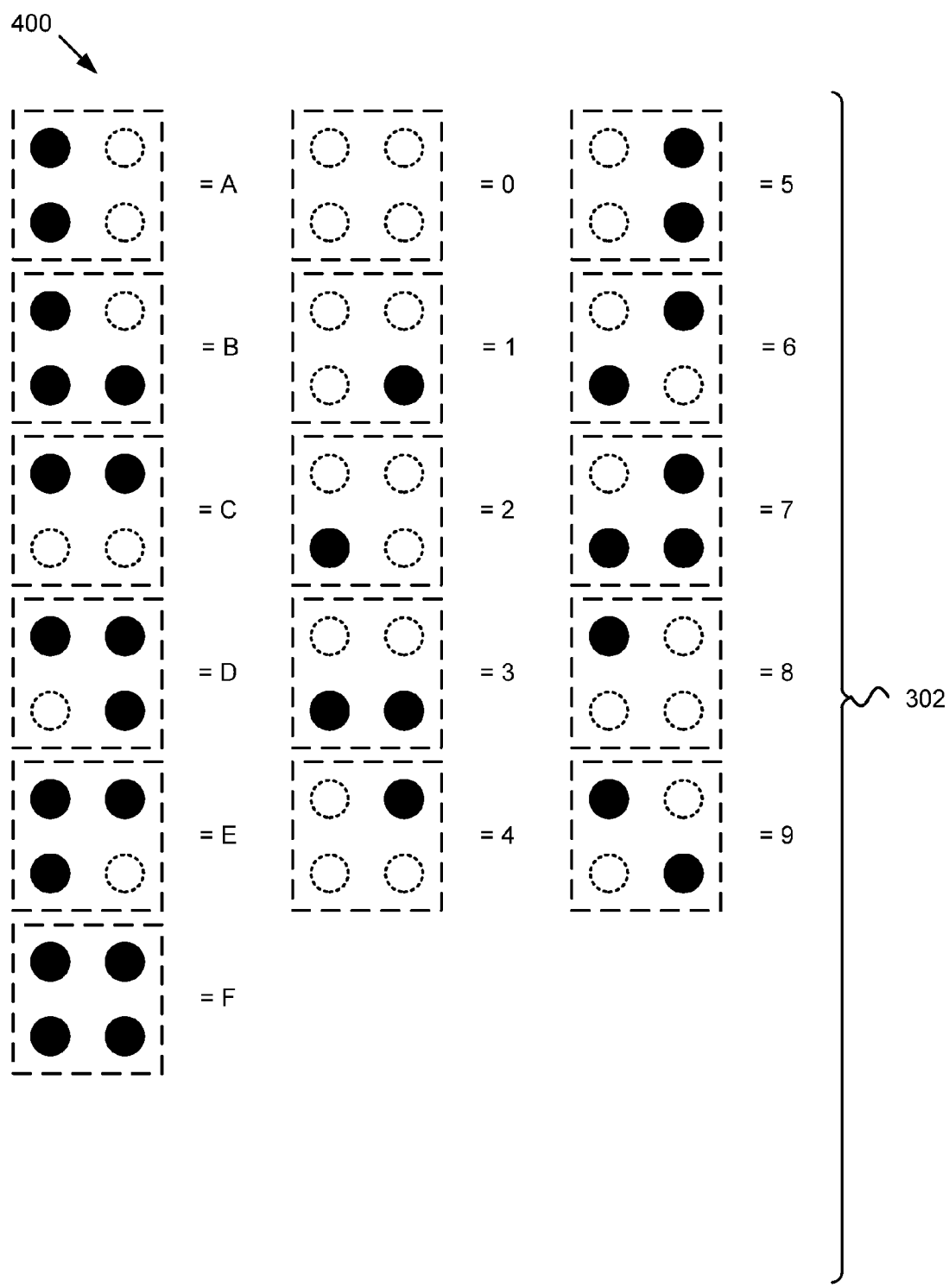
FIG. 4 is a schematic block diagram illustrating one embodiment of a cryptography system in accordance with the present invention.

A pattern of marks in the group of regularly spaced mark 304 locations is unique to each character 212 in the code 202. For example, FIG. 4 depicts a schematic block diagram illustrating one embodiment of a cryptography system 400 in accordance with the present invention. As discussed above, in certain embodiments, the cryptography module 106 defines a cryptographic representation 302 for each character 212 of the at least one character in the code 202.

In the embodiment illustrated in FIG. 4, each cryptographic representation 302 (FIG. 3A) includes a group or regularly spaced mark locations 304 (FIG. 3B) and each mark location has a mark selected from one of a normative mark 308a (FIG. 3B) and a native mark 308b-308d (FIG. 3b). Each pattern in a group of regularly spaced mark locations 304 is unique to each character 202 of the at least one character in the code 202.

Accordingly, as illustrated in FIG. 4, each of the groups of regularly spaced mark locations 302 has a unique pattern. For example, the pattern of marks for the group of regularly spaced mark locations 304 for the cryptographic representation 302 corresponding to the letter "A" includes normative marks 308a in the two leftmost mark locations 304 and native marks 308b-308d in the two rightmost mark locations 304. The pattern of marks for the group of regularly spaced mark locations 304 for the cryptographic representation 302 corresponding to the numeral "1" includes normative marks 308a in the two rightmost mark locations 304 and native marks 308b-308d in the two leftmost mark locations 304. Each of the pattern of marks for the group of regularly spaced mark locations 304 for the cryptographic representation 302 corresponding to the other numeric or alphabetic characters have unique patterns of normative marks 308a and native marks 308b-308d.

While the cryptography system 400 illustrates six (6) alphabetic characters corresponding to the letters "A-F" and ten numeric characters corresponding to the numerals "0-9," one of skill in the art will recognize that in other embodiments, the cryptography system 400 may have other alphabetic, numeric, or other characters capable of distinguishing a unit of content 204 (FIG. 2).

In the cryptography system 400 illustrated in FIG. 4, there are sixteen (16) total permutations of mark patterns in the groups of regularly spaced mark locations 304. The sixteen (16) permutations include every possible permutation for groups of mark locations 304 having four (4) possible variations of marks in four (4) possible mark locations 304. However, one of skill in the art will recognize that in certain embodiments, the cryptography system 400 may include more than sixteen (16) total characters 212. In such an embodiment, the groups of regularly spaced mark locations 304 may include more than four (4) mark locations 304 to accommodate additional variations of marks.

Figure 5:
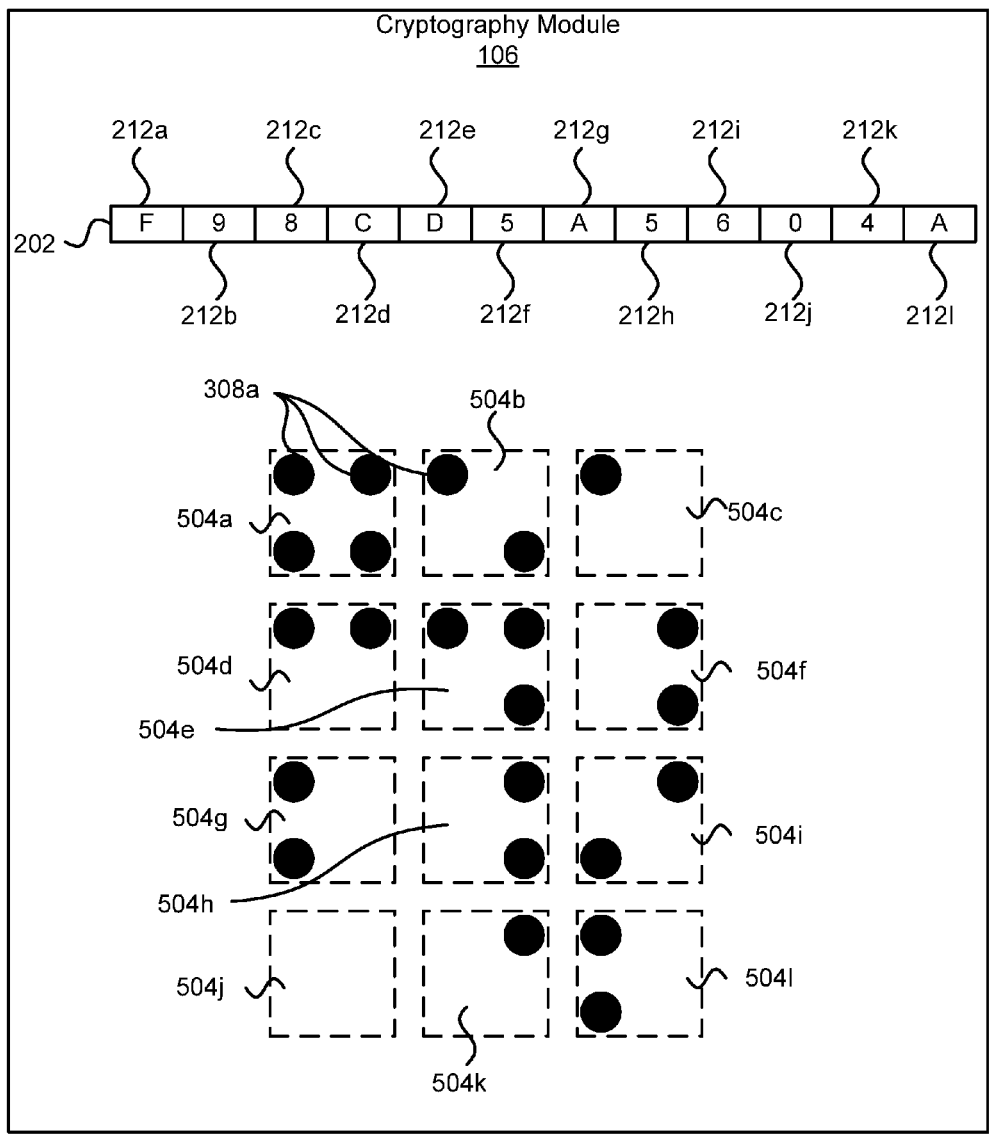
FIG. 5 is a schematic block diagram illustrating another embodiment of a cryptography module in accordance with the present invention.

FIG. 5 is a schematic block diagram illustrating another embodiment of a cryptography module 106 in accordance with the present invention. As discussed above, in certain embodiments, the cryptography module 106 defines a cryptographic representation 504 for each character 212 of the at least one character in the code 202, each cryptographic representation comprising a group 504 of regularly spaced mark locations 304 (FIG. 3B). As discussed above, in certain embodiments, only the normative marks 308a are added to an image at an appropriate mark location 304. In such an embodiment, the native marks 308b-308d are simply the native intensity values of the original image.

In certain embodiments, the group's 504 of regularly spaced mark locations 304 are positioned in a number of rows and columns. In one embodiment, the group's 504 of regularly spaced mark locations 304 are positioned in four rows and three columns. In other embodiments, the group's 504 of regularly spaced mark locations 304 may be positioned in more rows and columns. In yet another embodiment, the group's 504 of regularly spaced mark locations 304 are positioned in fewer rows and columns.

In the embodiment illustrated in FIG. 5, the patterns of marks in the groups 504 of regularly spaced mark locations 304 correspond to characters 212 in the code 202. Thus, character 212a, an "F" corresponds to the pattern of marks in the group 504a of regularly spaced mark locations 304. Similarly, character 212b, a "9" corresponds to the pattern of marks in the group 504b of regularly spaced mark locations 304. In this manner, each of the other characters 212c-212l in the code 202 is represented by the other group's 504c-504l.

As discussed above, the first character 212a typically represents a start indicator. Thus, the pattern of marks in group 504a corresponds to a start indicator, in this case a representation of the character "F" 212a. The last character 212l typically represents a stop indicator. Accordingly, the pattern of marks in group 504l corresponds to a stop indicator, in this case a representation of the character "A" 212l. The pattern of marks in groups 504j and 504k correspond to the error check section 218 (FIG. 2) of the code 202.

In the embodiment illustrated in FIG. 5, the group's 504 of regularly spaced mark locations 304 are shown as having a dashed line surrounding each group 504. One of skill in the art will recognize that the dashed lines are depicted for illustrative purposes and that in actual use, the dashed lines may be omitted.

Figure 6:
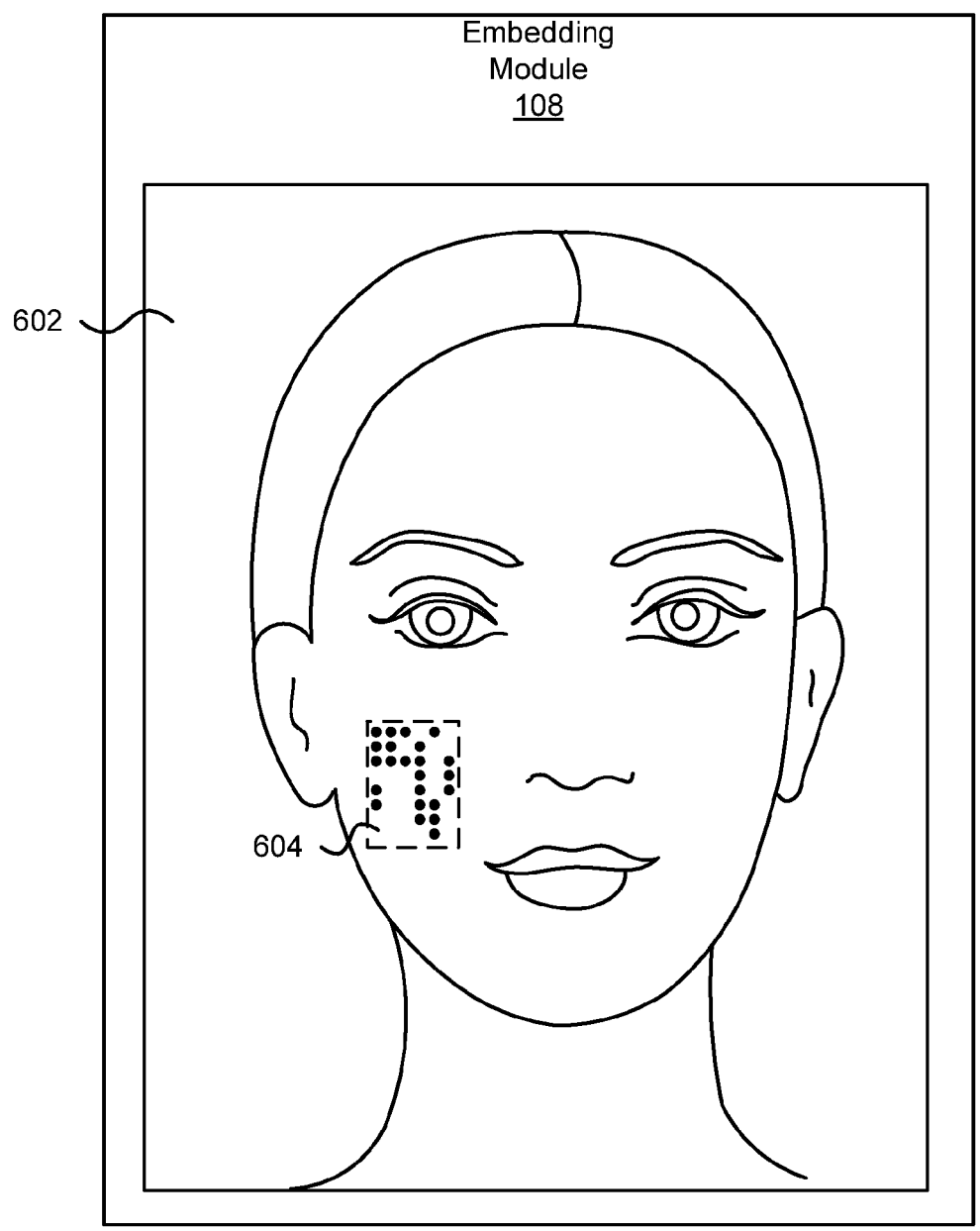
FIG. 6 is a schematic block diagram illustrating one embodiment of an embedding module in accordance with the present invention.

FIG. 6 is a schematic block diagram illustrating one embodiment of an embedding module 108 in accordance with the present invention. In certain embodiments, the embedding module 108 embeds the cryptographic representation 302 for each character 212 of the at least one character of the code 202 into at least a portion 604 of an image 602. In certain embodiments, the cryptographic representation 302 of each character 212 may be repeated throughout the image 602 such that the code 202 is redundantly represented throughout the image 602 such that the representation of the code 202 can be identified by scanning any portion of the image. As further discussed below, a distance between mark locations 304 in the image 602 indicates an orientation of the image 602.

In certain embodiments, the embedding module 108 embeds the cryptographic representation 302 for each character 212 of the at least one character of the code 202 into at least a portion 604 of an image 602 by adding a marking to the image 602. In one embodiment, the marking added to the image 602 has a perceptible difference between a native intensity value of a location in the image 602 (the original image intensity) and an intensity value of the marking added to the image 602. In certain embodiments, the perceptible difference between the native intensity value of the location in the image and the intensity value of the marking added to the image may be a difference that is greater than a pre-defined threshold. In other embodiments, the marking may have a maximum intensity value.

In one embodiment, the markings may be added to a multiple color channels of the image 602. In certain embodiments, the markings are added to a single color channel. In yet another embodiment, the markings are added to the blue color channel. Markings in the blue color channel may provide the least noticeable color variations such that the markings are difficult to perceive by a human and the image 602 having the embedded markings looks substantially similar to the original unembedded image.

Figure 7A:
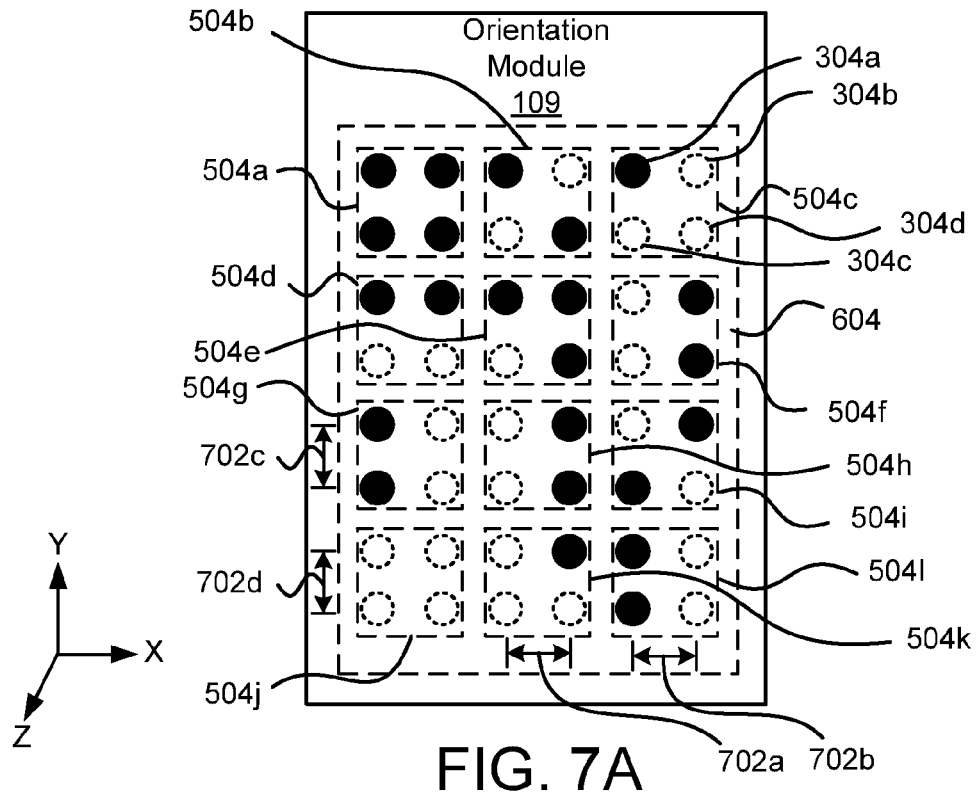
FIG. 7A is a schematic block diagram depicting one embodiment of an orientation module for determining an orientation of an image with the image substantially perpendicular to an image viewer.
Figure 7B:
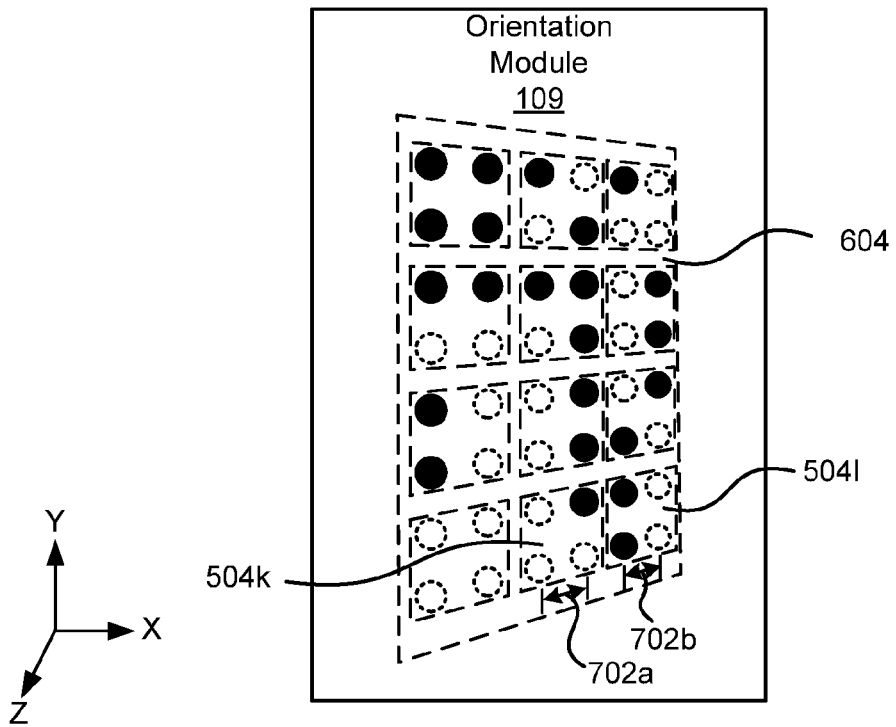
FIG. 7B illustrates a schematic block depicting an embodiment of an orientation module for determining an orientation of an image wherein the image is rotated about an y-axis with respect to an image viewer.
Figure 7C:
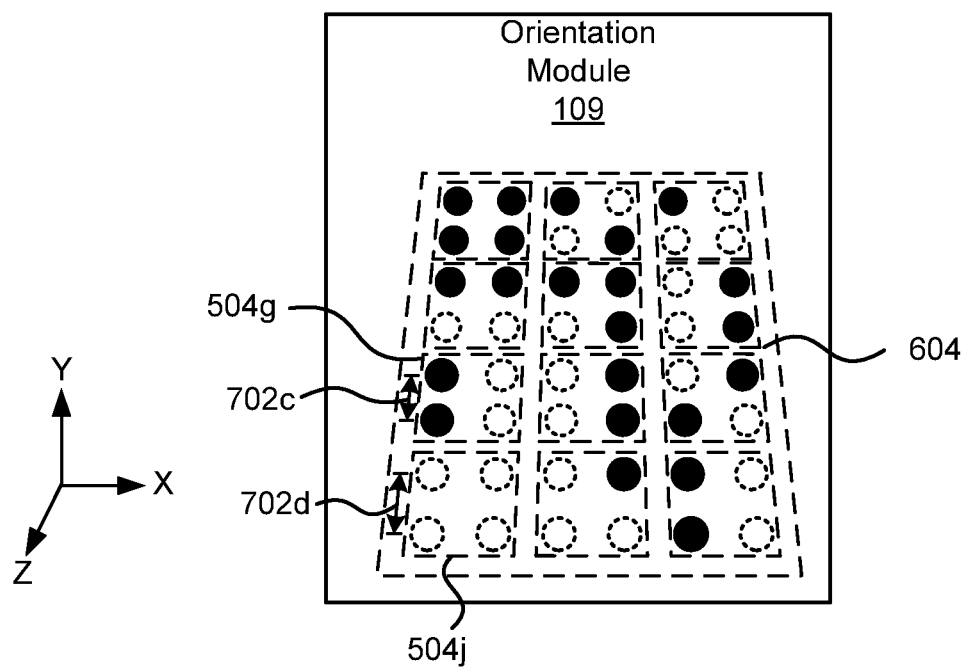
FIG. 7C illustrates a schematic block depicting an embodiment of an orientation module for determining an orientation of an image wherein the image is rotated about an x-axis with respect to an image viewer.

FIGS. 7A-7C illustrates various schematic block diagrams depicting embodiments of an orientation module 109 in accordance with the present invention. Specifically, FIG. 7A is a schematic block diagram depicting an embodiment of the orientation module 109 for determining an orientation of an image wherein the image is substantially perpendicular to an image viewer. FIG. 7B illustrates a schematic block depicting an embodiment of the orientation module 109 for determining an orientation of an image wherein the image is rotated about a y-axis with respect to an image viewer. FIG. 7C illustrates a schematic block depicting an embodiment of the orientation module 109 for determining an orientation of an image wherein the image is rotated about an x-axis with respect to an image viewer.

In certain embodiments, as further discussed below, the image viewer may be an image capturing module, such as a flatbed scanner, a digital camera, etc. that captures a rendering of the image 602 or a portion 604 of the image 602 having the groups 504 of regularly spaced mark locations 304 corresponding to the embedded cryptographic representations 302 of the code 202. Where the image 602 or the portion 604 of the image is substantially perpendicular to the image viewer, a distance between each mark locations 304 is approximately the same for all of the groups 504 of regularly spaced mark locations 304 corresponding to the embedded cryptographic representations 302 of the code 202.

For example, with reference to FIG. 7A, when the image 602 or the portion 604 of the image 602 is substantially perpendicular to an image viewer, a horizontal distance 702a between the regularly spaced mark locations 304 of group 504k is approximately the same as a horizontal distance 702b between the regularly spaced mark locations 304 of group 504l. Similarly, a vertical distance 702c between the regularly spaced mark locations 304 of group 504g is approximately the same as a vertical distance 702d between the regularly spaced mark locations 304 of group 504j. Distances between the regularly spaced mark locations 304 of the other group's 504a-504f, 504h, and 504i are also approximately the same.

When the image 602 or the portion 604 of the image 602 is rotated about the y-axis, as illustrated in FIG. 7B, the horizontal distances between the mark locations 304 changes depending on the position of the particular group 504 within the image 602 or portion 604 of the image 602. For example, because of the limitations with respect to depicting an image 602 or portion 604 of an image 602 in two dimensions, mark locations 304 located further away from the image viewer will appear closer together when viewed in two dimensions. Thus, the horizontal distance 702a between the regularly spaced mark locations 304 of group 504k is larger than a horizontal distance 702b between the regularly spaced mark locations 304 of group 504l when the image 602 or portion 604 of the image 602 is viewed in two dimensions. Because the image 602 or portion 604 of the image 602 depicted in FIG. 7B is only rotated about the y-axis, all of the vertical distances between the regularly spaced mark locations 304 of the groups 504 are approximately the same.

When the image 602 or the portion 604 of the image 602 is rotated about the x-axis, as illustrated in FIG. 7C, the vertical distances between the mark locations 304 also changes depending on the position of the particular group 504 within the image 602 or portion 604 of the image 602. Again, because of the limitations with respect to depicting an image 602 or portion 604 of an image 602 in two dimensions, mark locations 304 located further away from the image viewer will appear closer together when viewed in two dimensions. Thus, the vertical distance 702c between the regularly spaced mark locations 304 of group 504j is larger than the vertical distance 702d between the regularly spaced mark locations 304 of group 504g when the image 602 or portion 604 of the image 602 is viewed in two dimensions. Because the image 602 or portion 604 of the image 602 depicted in FIG. 7C is only rotated about the x-axis, all of the horizontal distances between the regularly spaced mark locations 304 of the groups 504 are approximately the same.

While the embodiments discussed above indicate that the orientation module 109 references distances between the mark locations 304 within various groups 504 to determine an orientation of the image 602 or portion 604 of the image 602, one of skill in the art will recognize that the orientation module 109 may use various other visual indicators to determine the orientation of the image 602 or portion 604 of the image 602. For example, in one embodiment, the orientation module 109 may reference a size of the markings within the mark locations 304 of the various groups 504 to determine the orientation of the image 602 or portion 604 of the image 602. Markings located further away from the image viewer will appear smaller than markings located closer to the image viewer.

In certain embodiments, the orientation module 109 of the image 602 or the portion 604 of the image 602 may be determined in three dimensions. For example, in one embodiment, the orientation module 109 may determine a rotation of the image 602 or the portion 604 of the image 602 about the y-axis as discussed above with reference to FIG. 7B. The orientation module 109 may also determine a rotation of the image 602 or the portion 604 of the image 602 about the x-axis as discussed above with reference to FIG. 7C. Determining the rotation of the image 602 or the portion 604 of the image 602 about the z-axis involves simply referencing which direction the groups 504 of regularly spaced mark locations 304 are rotated with respect to the z-axis.

One of skill in the art will recognize other ways of determining an orientation of at least a portion 604 of the image 602. For example, in certain embodiments, the orientation module 109 may use a size of the normative markings embedded within the image 602 to determine the orientation of the image 602. If the normative markings all have a substantially similar size in an image 602 that is substantially perpendicular to the image viewer, when the image 602 is rotated the normative markings that are positioned further away from the image viewer will appear smaller in the two dimensional rendering of the image 602. By comparing the relative sizes of the normative markings, the orientation module 109 can determine the orientation of the image 602.

In the embodiments illustrated in FIGS. 7A-7C, the native markings are shown as dashed lines for ease of illustration. However, as discussed above, in an exemplary embodiment, the native markings are simply native to the original image. Accordingly, in certain embodiments, native markings do not include any changes to the original image. Additionally, in FIGS. 7B and 7C reference numerals for mark locations 304 and groups 504 have been omitted for clarity. However, one of skill in the art will recognize that in certain embodiments the portion 604 of the image 602 depicted in FIG. 7A may be substantially similar to the portions 604 of the images 602 depicted in FIGS. 7B and 7C.

Figure 8:
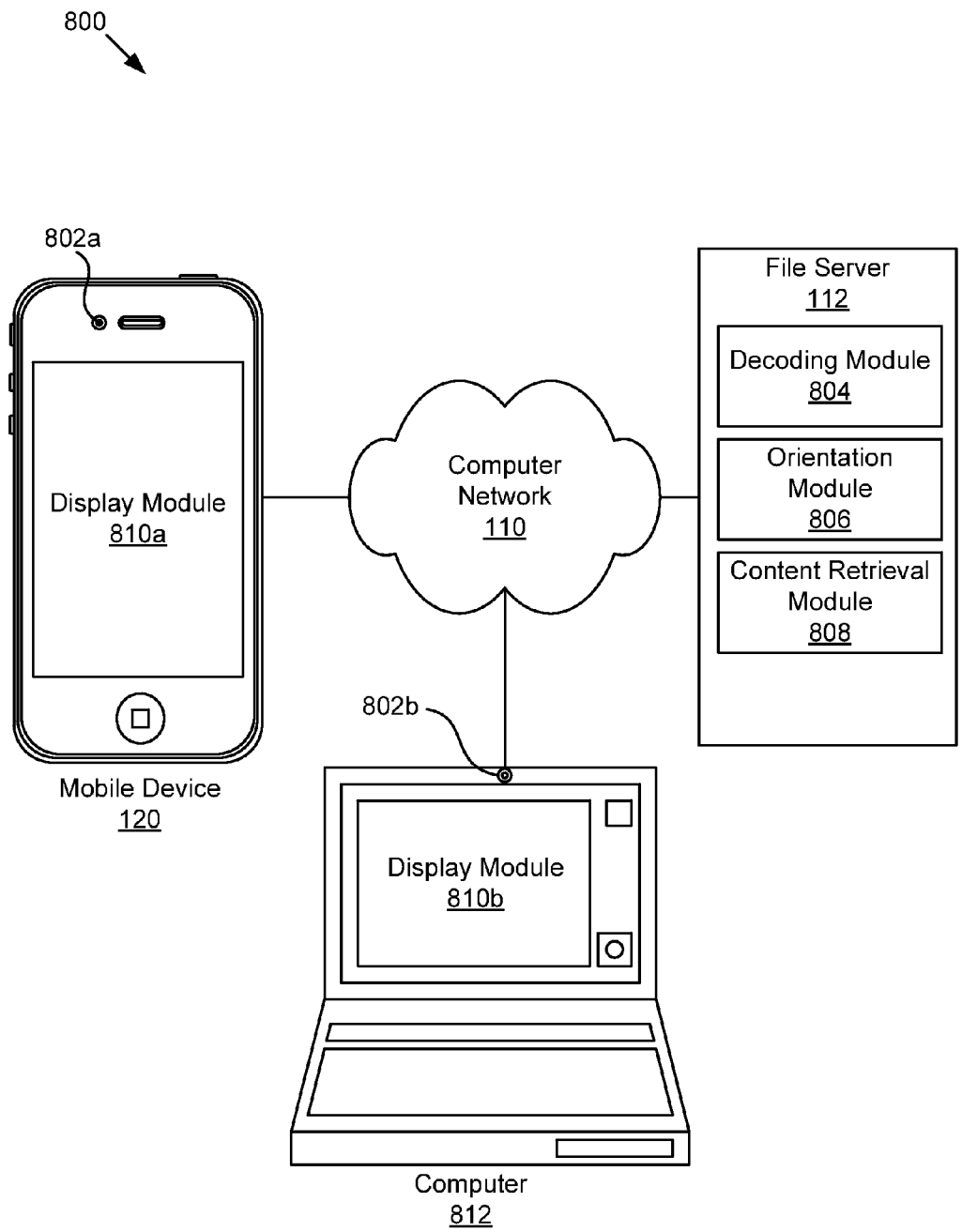
FIG. 8 is a schematic block diagram illustrating one embodiment of an apparatus to communicate content in accordance with the present invention.

FIG. 8 is a schematic block diagram illustrating one embodiment of an apparatus 800 to communicate content in accordance with the present invention. In certain embodiments, the apparatus 800 includes an image capturing module 802, a decoding module 804, an orientation module 806, a content retrieval module 808, and a display module 810.

While the embodiment illustrated in FIG. 8 depicts the decoding module 804, the orientation module 806, and the content retrieval module 808 as being stored on a file server 112, one skilled in the art will recognize that the decoding module 804, the orientation module 806, and the content retrieval module 808 may be contained within a mobile computing device 120, mainframe, a personal computer 812, a personal digital assistant, or other computing device.

The mobile computing device 120, personal computer 812 and the file server 112 are connected to the computer network 110 providing remote access to the image capturing module 802 the decoding module 804, the orientation module 806, and the content retrieval module 808 via a computer network 110. The image capturing module 802, decoding module 804, the orientation module 806, and the content retrieval module 808 may be accessed directly through input/output devices connected to the personal computer 812 or the mobile computing device 120. In other embodiments, the image capturing module 802, the decoding module 804, the orientation module 806, and the content retrieval module 808 may be accessed through the computer network 110 in a client-server relationship, remote access, or other network-related operation. One of skill in the art will recognize other ways to access the image capturing module 802, the decoding module 804, the orientation module 806, and the content retrieval module 808.

In one embodiment, the decoding module 804, the orientation module 806, and the content retrieval module 808 are stored on a data storage device in or connected to the personal computer 812 or mobile computing device 120. In another embodiment, the decoding module 804, the orientation module 806, and the content retrieval module 808 may be distributed in different locations throughout the apparatus 800. In certain embodiments the decoding module 804 may be stored on one device within the apparatus 800 and the orientation module 806 and the content retrieval module 808 may be stored other devices within the apparatus 800. One of skill in the art will recognize other ways to store and execute portions of the decoding module 804, the orientation module 806, and the content retrieval module 808.

The image capturing module 802, in certain embodiments, is a conventional camera or webcam coupled to or integral within one of the mobile computing device 120 or the personal computer 812. The image capturing module 802 captures a rendering of at least a portion of an image. For example, in one embodiment, the image capturing module 802 captures a rendering of the portion 604 of the image 602 discussed above with reference to FIG. 6. In the embodiment illustrated in FIG. 8, the image capturing module 802a is depicted on the same side of the mobile computing device 120 as the display module 810a and the image capturing module 802b is depicted on the same side of the computer 812 as the display module 810b. However, one of skill in the art will recognize that in other embodiments, the display modules 810a and 810b may be positioned on an opposite side of the mobile computing device 120 or the computer 812 respectively.

As discussed above, the image 602 includes an embedded cryptographic representation 302 of at least one character 212 in a code 202. The code 202 corresponds to a unit of content such as the units of content 206, 208, or 210 in FIG. 2. The embedded cryptographic representation 302 of the at least one character 212 in the code 202 identifies an orientation of at least a portion 604 of the image 602 as further discussed below.

The decoding module 804 decodes the embedded cryptographic representation 302 of the characters 212 in the code 202. In certain embodiments, the decoding module 804 uses the cryptography system 400 of FIG. 4 to decode the embedded cryptographic representation 302 of the characters 212 in the code 202. One of skill in the art will recognize other decoding methods for determining the characters 212 in the code 202.

In certain embodiments, the orientation module 806 determines an orientation of the rendering of at least a portion 604 of an image 602. In certain embodiments, the orientation module 806 uses the embedded cryptographic representation 302 of the at least one character 212 in the code 202 to identify the orientation of the portion 604 of the image 602 in a manner substantially similar to the manner in which the orientation module 109 of system 100 determines the orientation of the image 602 as discussed above with reference to FIGS. 7A-7C.

The content retrieval module 808 retrieves the unit of content 204 (i.e., a unit of content 206, 208, or 210) corresponding to the code 202 from a storage location. In certain embodiments, the storage location may be a storage module located on one of the file server 112, the mobile computing device 120, or the computer 812. In other embodiments, the storage location may be a remote website or other location accessible by the computer network 110.

The display module 810 displays the unit of content 204 (i.e., a unit of content 206, 208, or 210) on the user's computer 812 or mobile computing device 120. In certain embodiments, the unit of content 204 (i.e., a unit of content 206, 208, or 210) is displayed in an orientation corresponding to the orientation of the rendering of the at least a portion 604 of the image 602.

In certain embodiments, the display module 810 changes the displayed orientation of the unit of content 204 (i.e., a unit of content 206, 208, or 210) in response to the orientation module 806 determining that the orientation of the rendering of at least a portion 604 of the image 602 has changed.

Figure 9A:
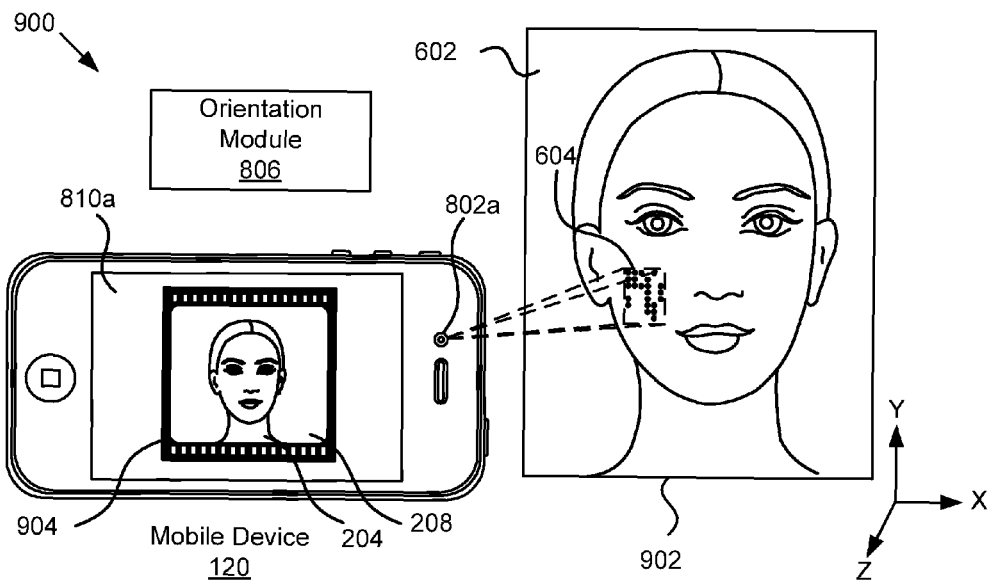
FIG. 9A is a schematic block diagram illustrating one embodiment of an operation of an orientation module and a display module for determining a first orientation of the embedded image and displaying a unit of content in an orientation corresponding to the first orientation in accordance with the present invention.
Figure 9B:
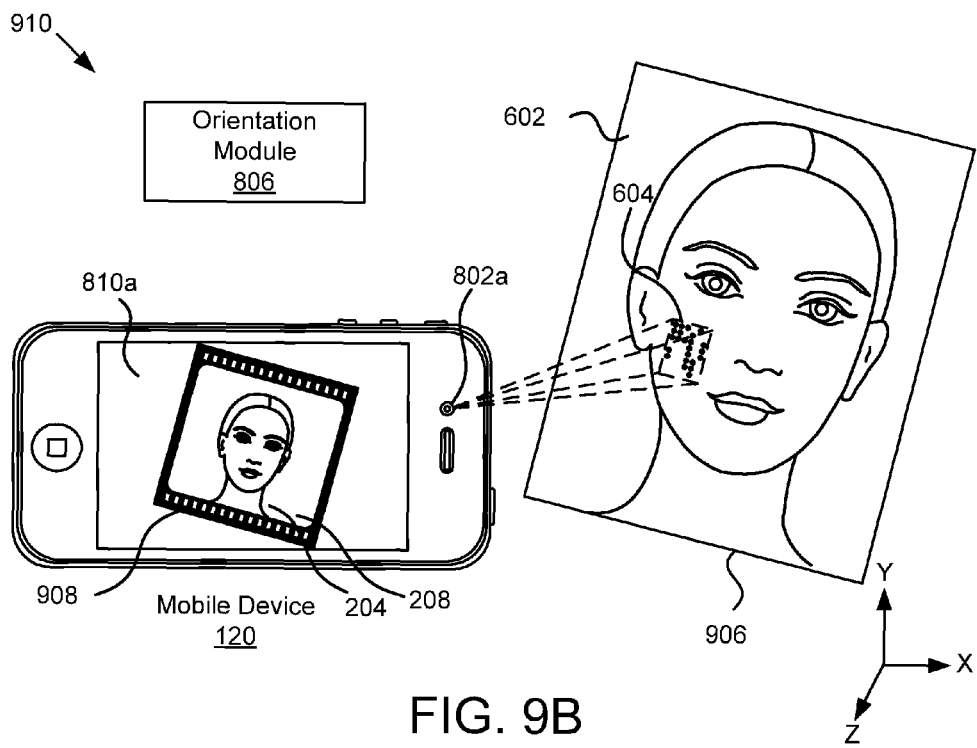
FIG. 9B is a schematic block diagram illustrating one embodiment of an operation of an orientation module and a display module for determining a second orientation of the embedded image and displaying a unit of content in an orientation corresponding to the second orientation in accordance with the present invention.

For example, FIG. 9A illustrates a schematic block diagram illustrating one embodiment of an operation 900 of the orientation module 806 and the display module 810a for determining a first orientation 902 of the embedded image 602 and displaying a unit of content 204 in an orientation 904 corresponding to the first orientation 902 in accordance with the present invention. FIG. 9B illustrates a schematic block diagram illustrating one embodiment of an operation 910 of the orientation module 806 and the display module 810a for determining a second orientation 906 of the embedded image 602 and displaying a unit of content 204 in an orientation 908 corresponding to the second orientation 906 in accordance with the present invention.

In FIG. 9A the image capturing module 802a has captured a rendering of at least a portion 604 of the image 602. As discussed above, in certain embodiments, the image capturing module 802a may capture a rendering of the entire image 602. In other embodiments, the image capturing module 802a may only capture rendering of a portion 604 of the image 602. In such an embodiment, a size of the portion 604 of the image 602 captured by the image capturing module 802a should be sufficient to contain the embedded cryptographic representations 302 for each character 212 of the at least one character 212 in the code 202.

In certain embodiments, the orientation module 806 references the position of mark locations 304 (FIG. 3B) to compare the distances 702 (FIG. 7A-7C) between the mark locations 304 and determine the orientation (the first orientation 902 as illustrated in FIG. 9A) of the image 602. In other embodiments, the orientation module 806 compares the size of normative markings in the mark locations 304 to determine the orientation (the first orientation 902 as illustrated in FIG. 9A) of the image 602.

The display module 810a uses the orientation (the first orientation 902 as illustrated in FIG. 9A) of the image 602, as determined by the orientation module 806, to display the unit of content 204 in an orientation 904 corresponding to the orientation (the first orientation 902 as illustrated in FIG. 9A) of the image 602. In the embodiment illustrated in FIGS. 9A and 9B, the unit of content 204 is illustrated as a video image 208. One of skill in the art will recognize that in other embodiments, the unit of content 204 may be any other information type communicable to a user via digital communication.

If the orientation of the image 602 changes, as illustrated in FIG. 9B, the image capturing module 802a captures a rendering of the image 602 or a portion 604 of the image 602 in the changed orientation. Thus, if the orientation of the image 602 changes from the first orientation 902, as illustrated in FIG. 9A, to a second orientation 908, as illustrated in FIG. 9B, the image capturing module 802a captures a rendering of the image 602 or a portion 604 of the image 602 in the changed orientation. In certain embodiments, the image capturing module 802a continuously or repeatedly captures renderings of the image 602 or a portion 604 of the image 602 as the orientation of the image 602 is the changed.

As the new orientations are captured by the image capturing module 802a, the orientation module 806 determines the new orientations of the image 602 and the display module 810a displays the unit of content 204 in orientations corresponding to the new orientations of the image 602.

In certain embodiments, the image capturing module 802a of the mobile computing device 120 and/or the image capturing module 802b of the computer 812 may also capture an environment surrounding the image 602. In such an embodiment, the display module 810a of the mobile computing device 120 and/or the display module 810b of the computer 812 may display the environment surrounding the image with the unit of content 204 superimposed on the environment surrounding the image 602.

Figure 10:
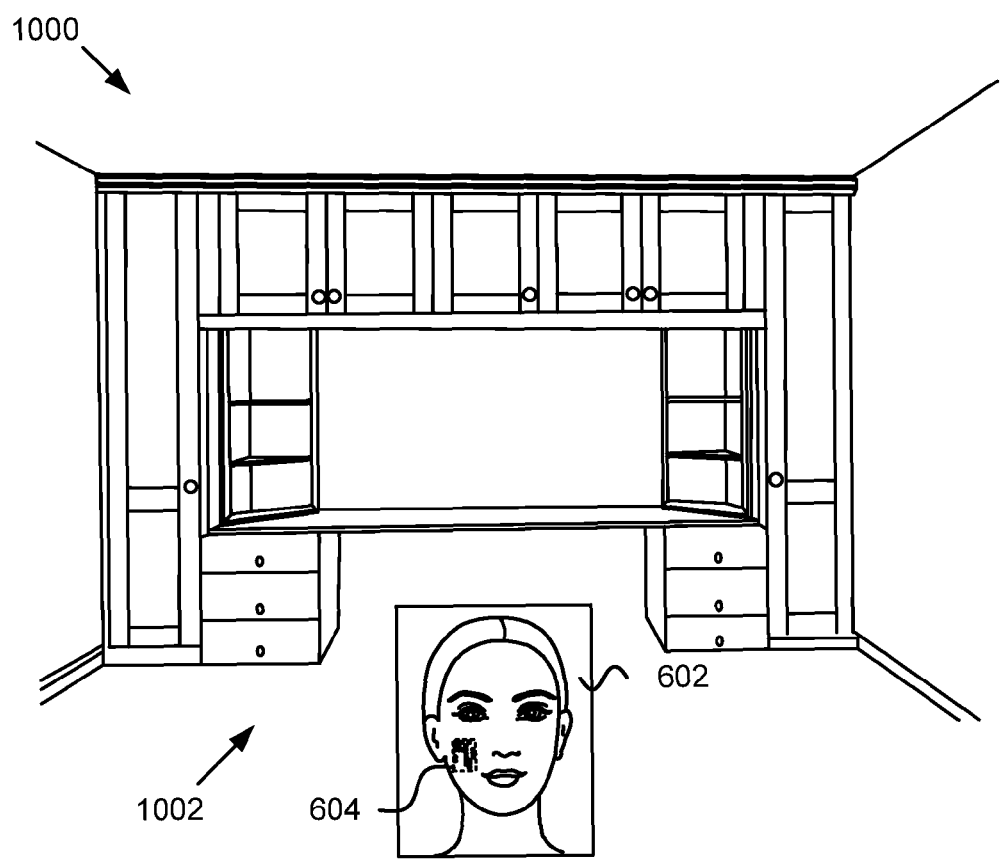
FIG. 10 is a schematic block diagram illustrating one embodiment of an operation of an image capturing module and a display module for superimposing a unit of content on a capture of an environment surrounding an image in accordance with the present invention.
Figure 10:
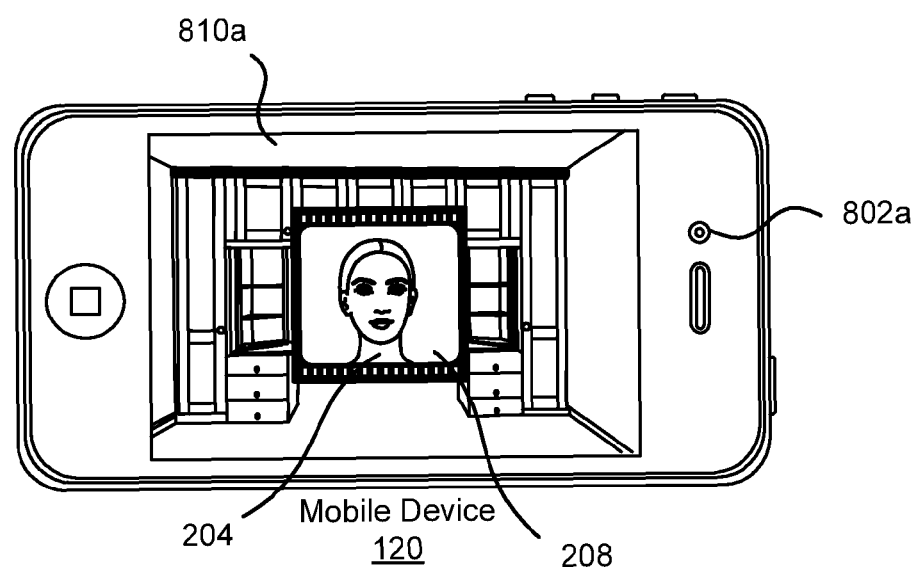

For example, FIG. 10 illustrates a schematic block diagram illustrating one embodiment of an operation 1000 of the image capturing module 802 and the display module 810a for superimposing a unit of content 204 on a capture of an environment 1002 surrounding an image 602. In certain embodiments, the image capturing module 802 captures a rendering of an environment 1002 surrounding an image 602 or a portion 604 of an image 602. If the image 602 or portion 604 of the image 602 includes embedded cryptographic representations 302 for each character 212 of the code 202, the decoding module 804 decodes the embedded cryptographic representations 302 of the characters 212 in the code 202 and the content retrieval module 808 retrieves the unit of content 204 corresponding to the code 202.

The display module 810a displays the environment 1002 surrounding the image 602 and overlays the unit of content 204 on top of the environment surrounding the image 602. Thus, in certain embodiments, the unit of content 204 appears to be emanating from the environment surrounding the image 602. In one embodiment, the orientation module 806 may determine the orientation of the image 602 and the display module 810a may display the unit of content 204 in an orientation corresponding to the orientation of the image 602.

The embodiments discussed above with reference to FIGS. 9A, 9B and 10 reference the image capturing module 802a and the display module 810a of the mobile computing device 120. However, one of skill in the art will recognize that the operations 900, 910, and 1000 of 9A, 9B and 10 may be performed with the image capturing module 802b and the display module 810b of the computer 812.

Figure 11:
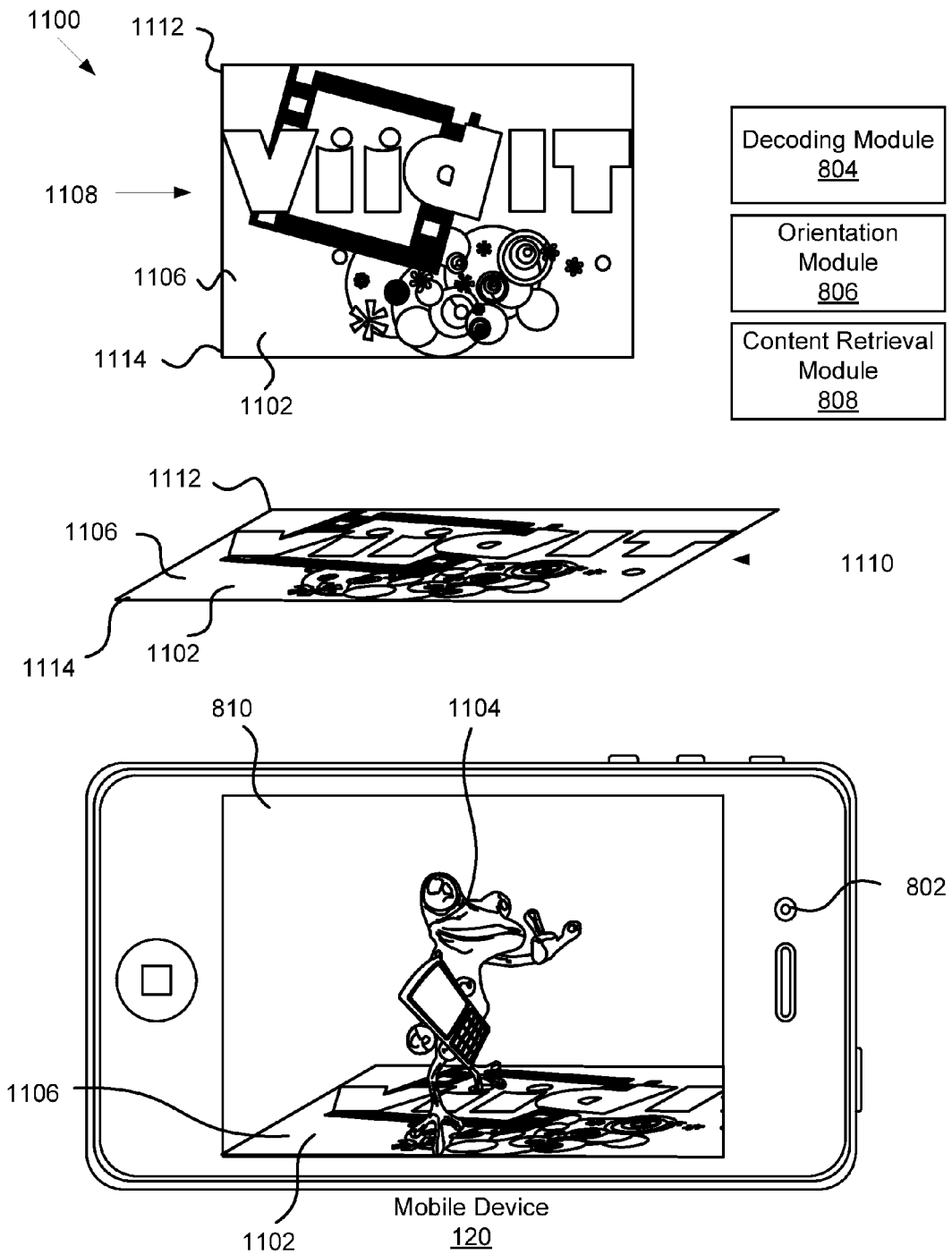
FIG. 11 is a schematic block diagram illustrating one embodiment of an apparatus to communicate content in accordance with the present invention.

FIG. 11 is a schematic block diagram illustrating another embodiment of an apparatus 1100 to communicate content in accordance with the present invention. In certain embodiments, the apparatus 800 includes an image capturing module 802, a decoding module 804, an orientation module 806, a content retrieval module 808, and a display module 810.

In certain embodiments, the image capturing module 802 captures a live video of an image 1102 and an environment surrounding the image 1102. The image 1102 includes an embedded cryptographic representation 302 of a code 202. The embedded cryptographic representation 302 of the code 202 and the code 202 itself are discussed above. In the embodiment illustrated in FIG. 11, the image capturing module 802 has captured a live video of a business card 1106 and the environment surrounding the business card 1106.

If the orientation of the image 1102 is altered with respect to the image capturing module 802, the display module 810 displays the live video of the image 1102 in the altered orientation. For example, FIG. 11 depicts the business card 1106 in a first orientation 1108 and a second orientation 1110. In the first orientation 1108, the business card 1106 is oriented in a substantially flat orientation with the top portion 1112 of the business card 1106 being substantially the same distance from the image capturing module 802 as the bottom portion 1114 of the business card 1106. In the second orientation 1110, the top portion 1112 is positioned further away from the image capturing module 802 than the bottom portion 1114.

The display module 810 displays a live video of the image 1102 (the business card 1106). Accordingly, as the orientation of the image 1102 changes, the display module 810 displays the image 1102 in the various new orientations.

In certain embodiments, the decoding module 804 decodes the embedded cryptographic representation 302 of the code 202 to determine the code 202. The code 202 corresponds to a unit of content 204 such as an image 206, a video image 208, a webpage 210, etc. In the embodiment illustrated in FIG. 11, the unit of content 204 is depicted as a three dimensional video image 208, in this case a three dimensional video image of a frog 1104.

Typically the embedded cryptographic representation 302 of the code 202 is difficult to detect in the image 1102. In certain embodiment, the embedded cryptographic representation 302 of the code 202 in the image 1102 is undetectable by a human but can be detected by electronic means. In the embodiment illustrated in FIG. 11, the embedded cryptographic representation 302 of the code 202 in the image 1102 is depicted as being unobservable by a human (i.e., the embedded cryptographic representation 302 of the code 202 is not illustrated in FIG. 11). However, one of skill in the art will recognize that in certain embodiments, the cryptographic representation 302 of the code 202 is included in the image 1102 and is observable by a computer implemented mechanism. For example, in one embodiment, the cryptographic representation 302 of the code 202 is included in the image 1102 in a single color channel (i.e., a blue color channel) which, when observed by a human is difficult or impossible to detect. In other embodiments, the cryptographic representation 302 of the code 202 may be observable in the image 1102 by a human upon close inspection but remains relatively unobservable upon casual inspection.

The decoding module 804 decodes the embedded cryptographic representation 302 of the code 202 to determine the code 202. The content retrieval module 808 uses the code 202, as determined by the decoding module 804, to retrieve the unit of content 204 (the three dimensional video image of the frog 1104) from a storage location. In certain embodiments, the unit of content 204 may be stored on a hard drive on a server. In other embodiments, the unit of content 204 may be stored on a hard drive of another computer accessible through a computer network such as computer network 110. One of skill in the art will recognize that the unit of content 204 may be stored on any storage device accessible by the mobile computing device 120 or the computer 812.

The display module 810 displays the live video of the image 1102 (the business card 1106). In one embodiment, the display module 810 also displays the unit of content 204 on the live video of image 1102 and/or the environment surrounding the image 1102. Thus, rather than directing a web browser to a website hosting the unit of content 204 and displaying the unit of content 204 within the web browser, the unit of content 204 is displayed directly in the display module 810 overlaying the image 1102 and/or the image 1102 environment. For example, in the embodiment illustrated in FIG. 11, the three dimensional video image of the frog 1104 is retrieved from the storage location and displayed on the live video image 1102 of the business card 1106. Because the video image of the frog 1104 is three dimensional, the frog appears to be standing on the video image 1102 of the business card 1106.

In certain embodiments, the apparatus 1100 includes an orientation module 806 that determines the orientation of the image 1102 (i.e., the business card 1106). In such an embodiment, the display module 810 displays the unit of content 204 (i.e., the video image of the frog 1104) in an orientation corresponding to the orientation of the image 1102. If the image 1102 (the business card 1106) is rotated to another orientation, the video image of the frog 1104 changes such that the frog appears to be standing on the business card 1106 in the different orientation. In certain embodiments, the display module 810 displays the unit of content 204 (the video image of the frog 1104) on the live video of the image 1102, with the unit of content 204 extending from the video image 1102 in three dimensions.

In one embodiment, the video image of the frog 1104 only includes image data for the frog (and any associated accessories held by the frog such as the cell phone illustrated in FIG. 11) and does not include any background image data. In such an embodiment, only the frog (and any associated accessories held by the frog) is shown as being overlaid on the video image 1102 of the business card 1106. In other embodiments, the frog may be shown in a virtual environment with the frog and the virtual environment overlaid on the video of the image 1102.

Figure 12:
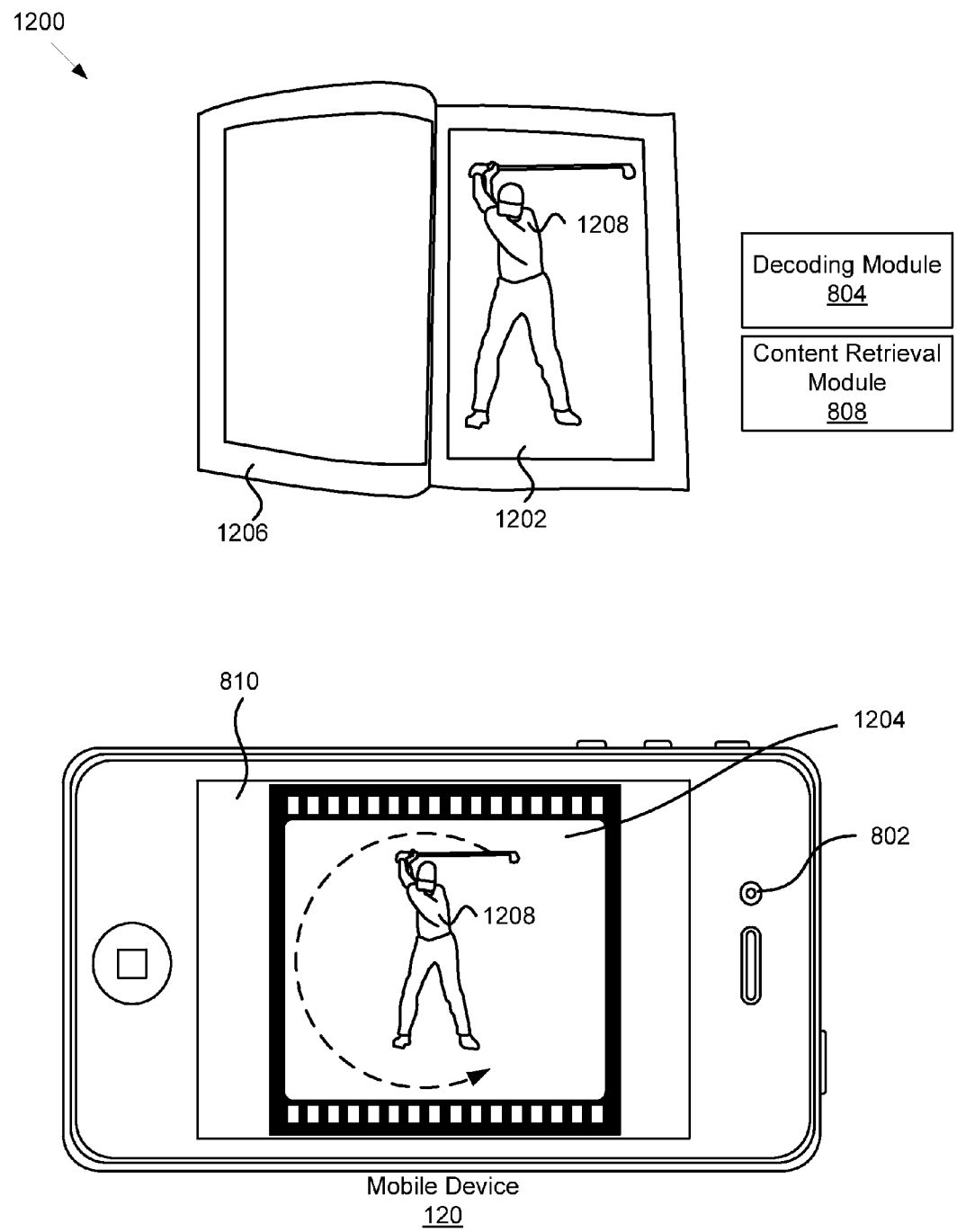
FIG. 12 is a schematic block diagram illustrating one embodiment of an apparatus to communicate content in accordance with the present invention.

FIG. 12 is a schematic block diagram illustrating another embodiment of an apparatus 1200 to communicate content in accordance with the present invention. In certain embodiments, the apparatus 800 includes an image capturing module 802, a decoding module 804, a content retrieval module 808, and a display module 810.

In certain embodiments, the image capturing module 802 captures a rendering of at least a portion of a first still image 1202. In such an embodiment, the first still image 1202 may be a shot from a sequence of images of a video 1204. For example, in the embodiment illustrated in FIG. 12, the first still image 1202 is depicted as a still image of a golfer 1208 with the golf club positioned at the pinnacle of the golfer's 1208 golf swing. The sequence of images of the video 1204 include a series of still images that make up a video 1204 of the golfer 1208 finishing the golf swing.

The first still image 1202 includes an embedded cryptographic representation 302 of a code 202 with the code 202 corresponding to the sequence of still images that make up the video 1204. The decoding module 804 decodes the embedded cryptographic representation 302 of the code 202 to identify the code 202. The content retrieval module 808 retrieves the sequence of still images of the video 1204 corresponding to the code 202, in this embodiment, the still images that make up the video 1204 of the golfer 1208 finishing the golf swing.

The display module 810 displays the sequence of still images of the video 1204. In certain embodiments, the first displayed shot of the video 1204 is the first still image 1202. The remainder of the video 1204 includes the remaining series of images from the sequence of images of the video 1204 displayed in chronological order. Thus, in one embodiment, the display module 810 displays the first still image 1202 first with the remainder of the still images of the golf swing being displayed in chronological order thereafter. In such an embodiment, the first still image 1202 appears to come alive such that the golfer 1208 appears to finish the golf swing.

In certain embodiments, the display module 810 automatically displays the sequence of still images of the video 1204 in response to the decoding module 804 decoding the embedded cryptographic representation 302 of the code 202 and the content retrieval module 808 retrieving the sequence of still images of the video 1204 corresponding to the code 202. Thus, when an image 1202 having an embedded cryptographic representation 302 of a code 202 is positioned within the view of the image capturing module 802, the display module 810 displays a video 1204 of the image 1202 beginning at the point in time at which the image 1202 was captured.

While the embodiment illustrated in FIG. 12 depicts a video of a golfer 1208 completing a golf swing, one of skill in the art will recognize that the apparatus 1200 may be used with any series of images that make up a video 1204 to make a single still image 1202 appear to come alive. For example, in one embodiment, the single still image 1202 may be a still of a bride in a photo shoot and the apparatus 1200 may appear to make the bride come alive to finish the photo shoot. In other embodiments, the single still image 1202 may be a magazine advertisement for an automobile, wherein the automobile "comes alive" to show the performance characteristics of the automobile. In yet another embodiment, the apparatus 1200 may be used to make any still image 1202 appear to "come alive."

Figure 13:
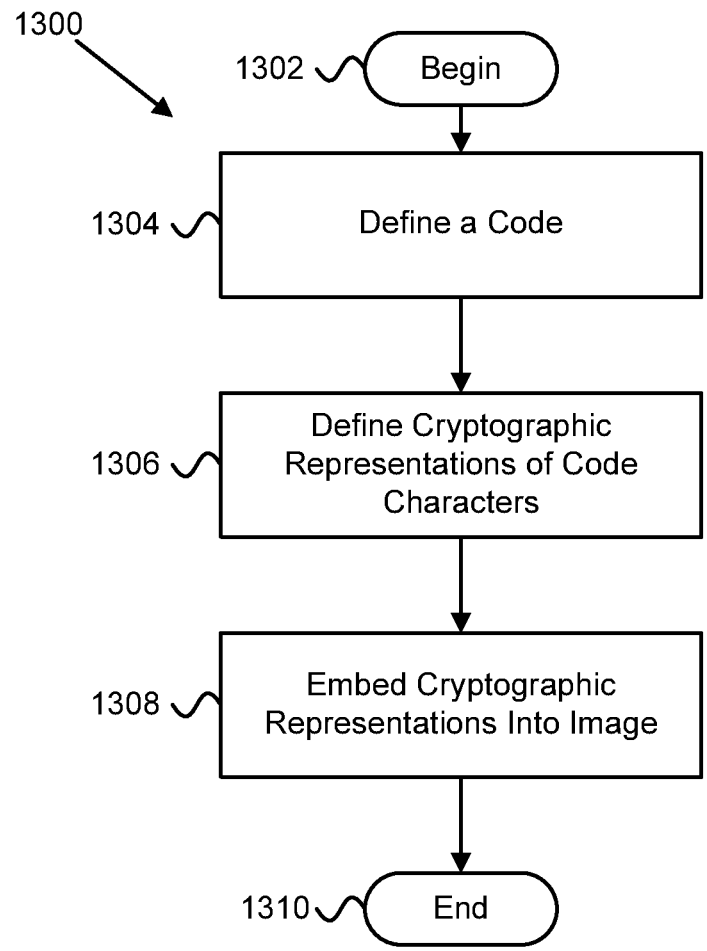
FIG. 13 is a schematic flowchart diagram illustrating one embodiment of a method of embedding information in an image in accordance with the present invention.

FIG. 13 illustrates a schematic flowchart diagram of a method 1300 of embedding information in an image 602 according to one embodiment of the present invention. In certain embodiments, the method 1300 may be performed using the system 100 described above.

The method 1300 begins 1302 and the code definition module 104 defines 1304 a code 202 corresponding to a unit of content 204. As discussed above, the code 202 includes at least one character 212. The cryptography module 106 defines a cryptographic representation 302 for each character 212 of the at least one character 212 in the code 202.

Each cryptographic representation 302 includes a group 504 of regularly spaced mark locations 304. Each mark location 304 includes a mark selected from one of a normative mark and a native mark. A pattern of marks in the group 504 of regularly spaced mark locations 304 is unique to each character 212 of the at least one character 212 in the code 202.

In one embodiment, the embedding module 108 embeds 1308 the cryptographic representation 302 for each character 212 of the at least one character 212 of the code 202 into at least a portion of an image 602, with the distance between mark locations 304 in the image 602 indicate an orientation of the image 602 and the method ends 1310.

In one embodiment, the method 1300 also includes determining an orientation of the image 602 having the embedded cryptographic representations 302 by comparing a distance 702 between mark locations 304 in a first group 504 of regularly spaced mark locations with a distance 702 between mark locations 304 in a second group 504 of regularly spaced mark locations 304. In such an embodiment, the distance 702 between mark locations 304 in the various groups 504 indicates an orientation of the image 602. In other embodiments, the orientation module 109 may compare the sizes of markings contained within the mark locations 304 to determine the orientation of the image 602.

Figure 14:
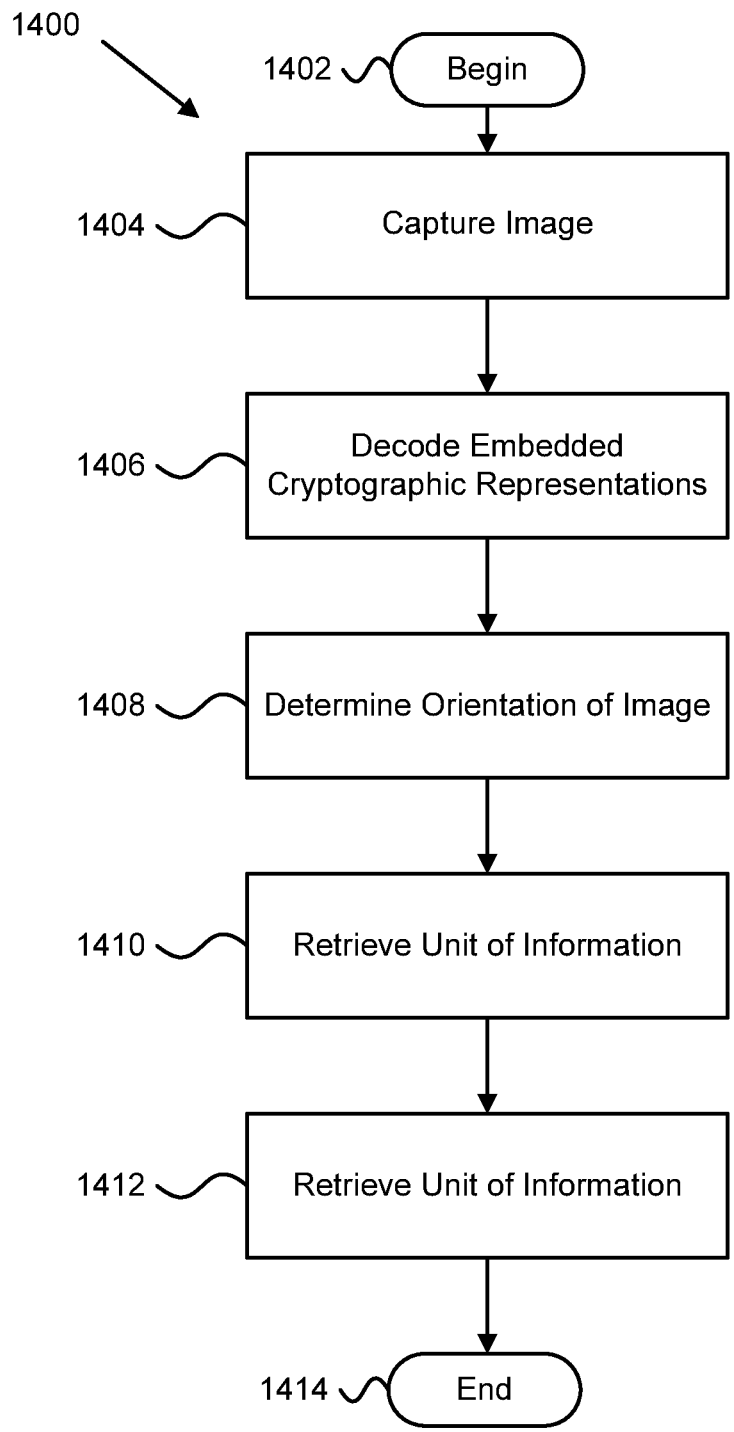
FIG. 14 is a schematic flowchart diagram illustrating one embodiment of a method to communicate content in accordance with the present invention.

FIG. 14 is a schematic flowchart diagram illustrating one embodiment of a method 1400 to communicate content in accordance with the present invention. In certain embodiments, the method 1400 may be performed using the apparatus 800 described above.

The method 1400 begins 1402 and the image capturing module 802 captures 1404 a rendering of at least a portion 604 of an image 602 having an embedded cryptographic representation 302 of at least one character 212 in a code 202. The code 202 corresponds to a unit of content 204. The embedded cryptographic representation 302 of the characters 212 identifies an orientation of the at least a portion 604 of the image 602.

The decoding module 804 decodes 1406 the embedded cryptographic representations 302 of the characters 212 in the code 202. The orientation module 806 determines 1408 an orientation of the rendering of the image 602. The content retrieval module 808 retrieves 1410 the unit of content 204 corresponding to the code 202 from a storage location and the display module 810 displays 1412 unit of content 204 in an orientation corresponding to the orientation of the rendering of the image 602. The method 1400 then ends 1414.

The above described systems, apparatus and methods may be particularly useful in a marketing program. For example, in certain embodiments, any image 602 may be embedded with cryptographic representations 302 of a code 202. In an exemplary embodiment, the cryptographic representations 302 of the code 202 may be embedded into images 602 used as logos, advertisements, magazine articles, etc. Because the code 202 is linked or otherwise identifies a particular unit of content 204, the image 602 may be used to retrieve that unit of content 204. The unit of content 204 may then be displayed to the user to provide additional information about the image owner's products or services. One of skill in the art will recognize that the present invention may be useful in any arena where an individual would like to convey information in a limited space (i.e. in an image 602).

Figure 15:
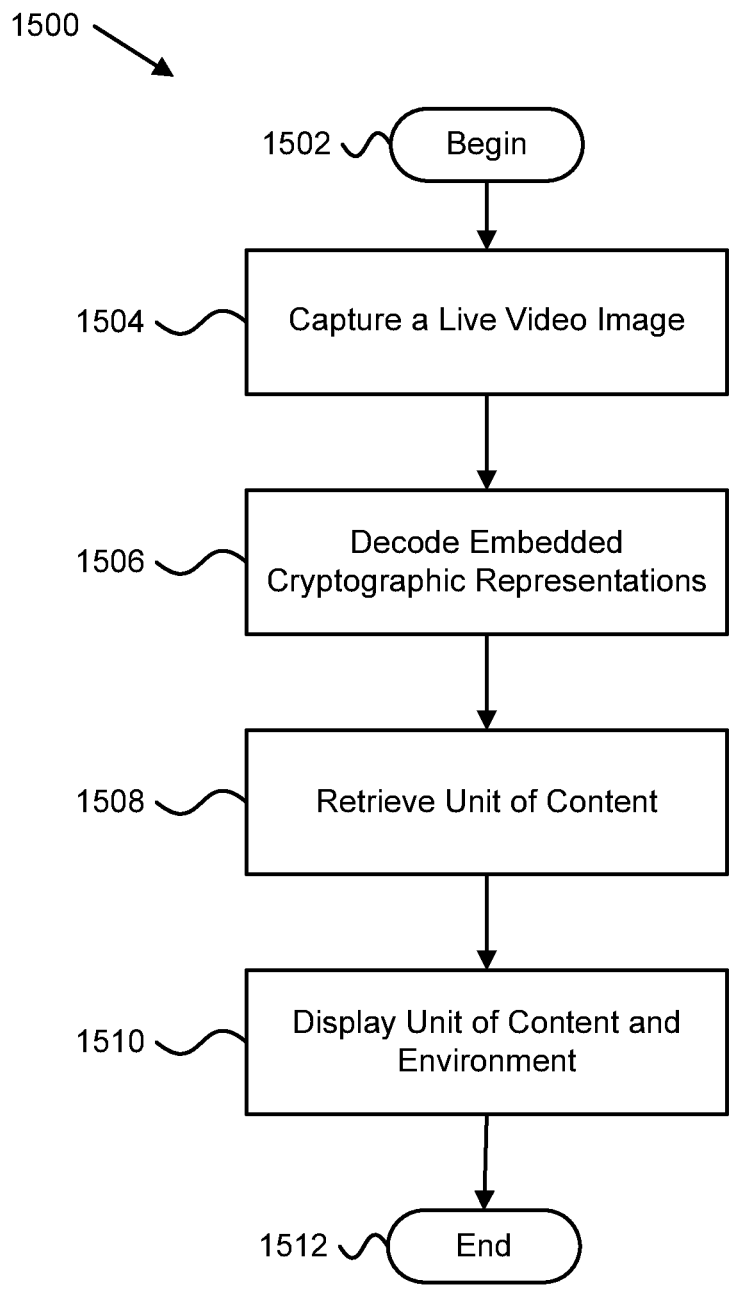
FIG. 15 is a schematic flowchart diagram illustrating one embodiment of a method to capture live video of an image with embedded code to access and communicate content in accordance with the present invention.

FIG. 15 is a schematic flowchart diagram illustrating one embodiment of a method 1500 to capture live video of an image with embedded code to access and communicate content in accordance with the present invention. The method 1500 begins 1502 and captures 1504 a live video of an image and an environment surrounding the image. The image has an embedded cryptographic representation of a code where the code corresponds to a unit of content. The method 1500 may also determine (not shown) an orientation of the image. In one embodiment, the embedded cryptographic representation of the at least one character identifies an orientation of the at least a portion of the image.

The method 1500 decodes 1506 the embedded cryptographic representation of the code and retrieves 1508 the unit of content corresponding to the code from a storage location. The method 1500 displays 1510 the unit of content on the live video of the image and/or the image environment, and the method 1500 ends 1512. The unit of content may be a video, an image, or other type of image.

Figure 16:
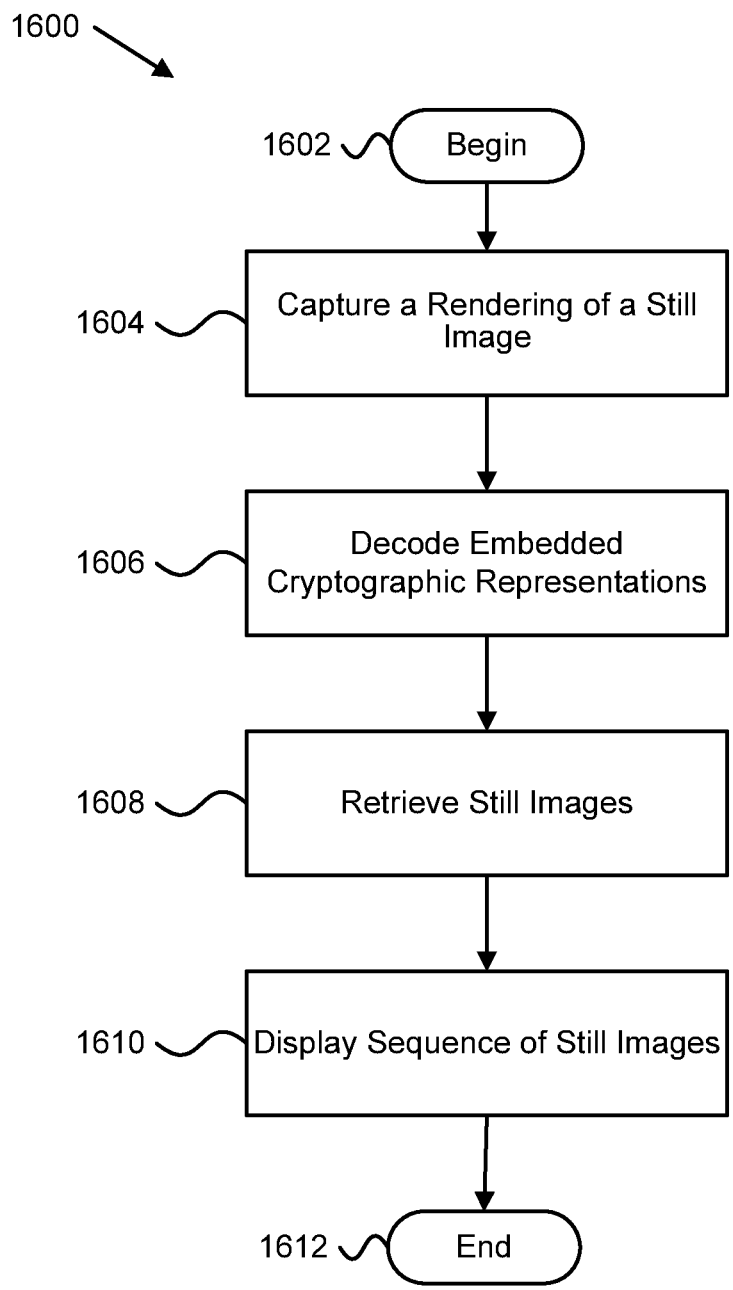
FIG. 16 is a schematic flowchart diagram illustrating one embodiment of a method to capture a rendering of a still image with embedded code to access and communicate a sequence of related still images in accordance with the present invention.

FIG. 16 is a schematic flowchart diagram illustrating one embodiment of a method 1600 to capture a rendering of a still image with embedded code to access and communicate a sequence of related still images in accordance with the present invention. The method 1600 begins 1602 and captures 1604 a rendering of at least a portion of a first still image. The first still image includes a shot from a sequence of images of a video. The first still image has an embedded cryptographic representation of a code where the code corresponds to the sequence of still images comprising the video.

The method 1600 decodes 1606 the embedded cryptographic representation of the code to identify the code and retrieves 1608 the sequence of still images of the video corresponding to the code. The method 1600 displays 1610 the sequence of still images of the video, and the method 1600 ends 1612. A first displayed shot of the video includes the first still image and a remainder of the video includes a remaining series of images from the sequence of images of the video displayed in chronological order. In one embodiment, displaying 1610 the sequence of still images of the video includes automatically displaying the sequence of still images of the video in response to decoding 1606 the embedded cryptographic representation of the code and retrieving 1608 the sequence of still images of the video corresponding to the code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to communicate content, the apparatus comprising:
    a capturing module that captures a live video of an image and an environment surrounding the image, the image having an embedded cryptographic representation of at least one character of a code, the code corresponding to a unit of content, the embedded cryptographic representation of the at least one character identifying an orientation of the image, wherein each cryptographic representation of each character of the code comprises a group of a plurality of regularly spaced mark locations, the orientation of the image determined by determining a first distance between mark locations in a first group of regularly spaced mark locations, and determining a second distance between mark locations in a second group of regularly spaced mark locations, and comparing the first distance with the second distance;
    a decoding module that decodes the embedded cryptographic representation of the code;
    a content retrieval module that retrieves the unit of content corresponding to the code from a storage location; and
    a display module that displays the unit of content on at least one of the live video of the image and the image environment as a function of the determined orientation of the image,
    wherein said modules comprise one or more of a hardware circuit, a programmable hardware device, and executable code executing on a hardware processor.

2. The apparatus of claim 1, further comprising an orientation module that determines an orientation of the image.

3. The apparatus of claim 2, wherein the display module displays the unit of content in an orientation corresponding to the orientation of the image.

4. The apparatus of claim 2, wherein the display module displays the unit of content on the live video of the image, with the unit of content extending from the image in three dimensions.

5. The apparatus of claim 4, wherein an orientation of the unit of content changes in response to a change in the orientation of the image.

6. The apparatus of claim 1, wherein each mark location has a mark selected from one of a nonnative mark and a native mark, wherein a pattern of marks in the group of regularly spaced mark locations is unique to each character in the code.

7. The apparatus of claim 6, wherein the nonnative mark comprises a marking added to the image, the marking having a perceptible difference between a native intensity value of a location in the image and an intensity value of the marking added to the image.

8. The apparatus of claim 7, wherein the perceptible difference between the native intensity value of the location in the image and the intensity value of the marking added to the image comprises a difference that is greater than a predefined threshold.

9. The apparatus of claim 7, wherein the marking is added to a particular color channel of the image.

10. The apparatus of claim 9, wherein the marking is added to a blue color channel of the image.

11. The apparatus of claim 1, wherein the display module changes the displayed orientation of the unit of content in response to the orientation module determining that the orientation of the rendering of at least a portion of the image has changed.

12. The apparatus of claim 1, wherein the capture module captures the live video of the image using one or more of a video camera connected to a computing device, a video camera in a smartphone, a video camera in a tablet computer, and a video camera in a laptop computer.

13. A method for communicating content, the method comprising:
    capturing a live video of an image and an environment surrounding the image, the image having an embedded cryptographic representation of at least one character of a code, the code corresponding to a unit of content, the embedded cryptographic representation of the at least one character identifying an orientation of the image, wherein each cryptographic representation of each character of the code comprises a group of a plurality of regularly spaced mark locations, the orientation of the image determined by determining a first distance between mark locations in a first group of regularly spaced mark locations, and determining a second distance between mark locations in a second group of regularly spaced mark locations, and comparing the first distance with the second distance;
    decoding the embedded cryptographic representation of the code;

retrieving the unit of content corresponding to the code from a storage location; and displaying the unit of content on at least one of the live video of the image and the image environment as a function of the determined orientation of the image.

14. The method of claim 13, further comprising determining an orientation of the image.

15. The method of claim 14, wherein displaying the unit of content comprises displaying the unit of content in an orientation corresponding to the orientation of the image.

16. The method of claim 13, wherein each mark location has a mark selected from one of a nonnative mark and a native mark, wherein a pattern of marks in the group of regularly spaced mark locations is unique to each character in the code.

17. A system for communicating content, the system comprising:
- a computing device;
- a display device in communication with the computing device;
- a video camera in communication with the computing device, the computing device comprising
  - a capturing module that captures a live video of an image using the video camera and an environment surrounding the image using the video camera, the image having an embedded cryptographic representation of at least one character of a code, the code corresponding to a unit of content the embedded cryptographic representation of the at least one character identifying an orientation of the image, wherein each cryptographic representation of each character of the code comprises a group of a plurality of regularly spaced mark locations, the orientation of the image determined by determining a first distance between mark locations in a first group of regularly spaced mark locations, and determining a second distance between mark locations in a second group of regularly spaced mark locations, and comparing the first distance with the second distance;
- a decoding module that decodes the embedded cryptographic representation of the code;
- a content retrieval module that retrieves the unit of content corresponding to the code from a storage location; and
- a display module that displays, on the display device, the unit of content on at least one of the live video of the image and the image environment as a function of the determined orientation of the image.

* * * * *